(12) United States Patent
Talbi

(10) Patent No.: US 12,460,804 B2
(45) Date of Patent: Nov. 4, 2025

(54) SYSTEM AND METHOD FOR INTEGRATING SMART ELECTRICAL ELEMENTS

(71) Applicant: Aziz Talbi, Davenport, IA (US)

(72) Inventor: Aziz Talbi, Davenport, IA (US)

(*) Notice: Subject to any disclaimer, the term of this patent is extended or adjusted under 35 U.S.C. 154(b) by 0 days.

(21) Appl. No.: 18/215,630

(22) Filed: Jun. 28, 2023

(65) Prior Publication Data

US 2025/0003581 A1    Jan. 2, 2025

Related U.S. Application Data

(63) Continuation-in-part of application No. 16/845,081, filed on Apr. 10, 2020, now Pat. No. 11,732,850.

(51) Int. Cl.
| | | |
|---|---|---|
| *F21V 21/35* | (2006.01) | |
| *F21V 15/01* | (2006.01) | |
| *F21V 23/00* | (2015.01) | |
| *F21V 33/00* | (2006.01) | |

(52) U.S. Cl.
CPC .............. *F21V 21/35* (2013.01); *F21V 15/01* (2013.01); *F21V 23/003* (2013.01); *F21V 33/0076* (2013.01); *F21V 33/008* (2013.01)

(58) Field of Classification Search
CPC ......... F21V 21/35; F21V 23/003; F21V 15/01
See application file for complete search history.

(56) References Cited

U.S. PATENT DOCUMENTS

| | | | |
|---|---|---|---|
| 6,350,046 B1 | 2/2002 | Lau | |
| 6,948,831 B1 | 9/2005 | Naqvi | |
| 10,113,911 B2 | 10/2018 | Coombes | |
| 10,808,922 B1* | 10/2020 | Hsu | F21V 33/0056 |
| 10,900,644 B1 | 1/2021 | Steines | |
| 10,977,920 B2* | 4/2021 | Nelson | G08B 7/066 |
| 2005/0265016 A1 | 12/2005 | Rappaport | |
| 2006/0177088 A1 | 8/2006 | Howard | |
| 2007/0253193 A1 | 11/2007 | Lau | |
| 2009/0072970 A1 | 3/2009 | Barton | |
| 2010/0148672 A1* | 6/2010 | Hopper | F21V 23/0442 315/158 |
| 2010/0246193 A1 | 9/2010 | Clifton | |
| 2015/0338077 A1* | 11/2015 | Johnson | F21V 23/0442 362/249.02 |
| 2016/0150135 A1* | 5/2016 | Chen | H05B 45/20 348/151 |
| 2016/0334082 A1 | 11/2016 | Chen | |
| 2017/0105632 A1 | 4/2017 | Chen | |

(Continued)

FOREIGN PATENT DOCUMENTS

WO    2018165058    9/2018

*Primary Examiner* — Bryon T Gyllstrom

(57) ABSTRACT

The present disclosure pertains to an apparatus, system, and methods for deploying and maintaining smart devices, specifically focusing on a smart lighting system. The scope extends beyond smart homes, encompassing smart buildings, smart cities, and other applications. The disclosure involves a collection of interconnected smart lighting systems and devices, along with methods for housing, powering, and managing these devices to carry out a diverse range of smart functions and tasks. The disclosure aims to provide comprehensive insights into the integration and utilization of smart devices within various environments.

20 Claims, 15 Drawing Sheets

(56) References Cited

U.S. PATENT DOCUMENTS

| | | | |
|---|---|---|---|
| 2017/0238401 A1* | 8/2017 | Sadwick | A61N 5/0618 |
| | | | 315/294 |
| 2018/0091715 A1 | 3/2018 | Chen | |
| 2019/0075634 A1* | 3/2019 | Cho | F21V 23/045 |
| 2019/0113220 A1* | 4/2019 | Haase | H04R 1/24 |
| 2020/0260181 A1 | 8/2020 | Talbi | |

* cited by examiner

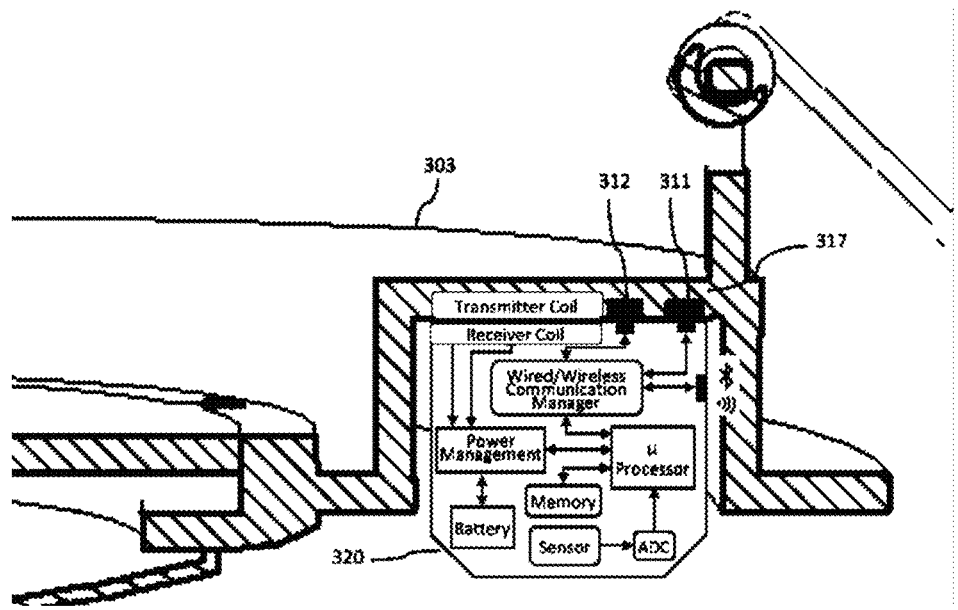
FIG. 3E1
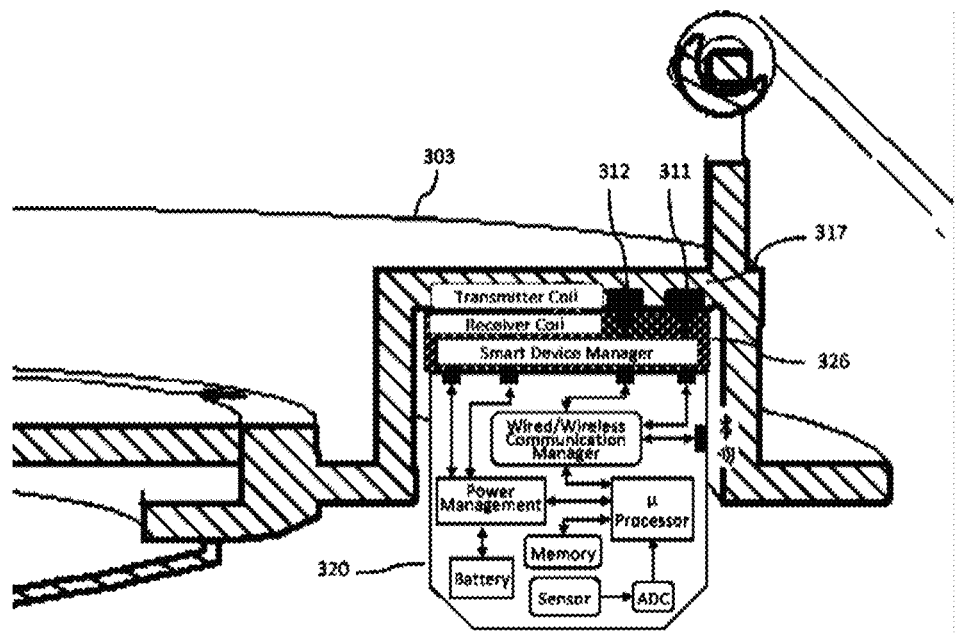
FIG. 3E2

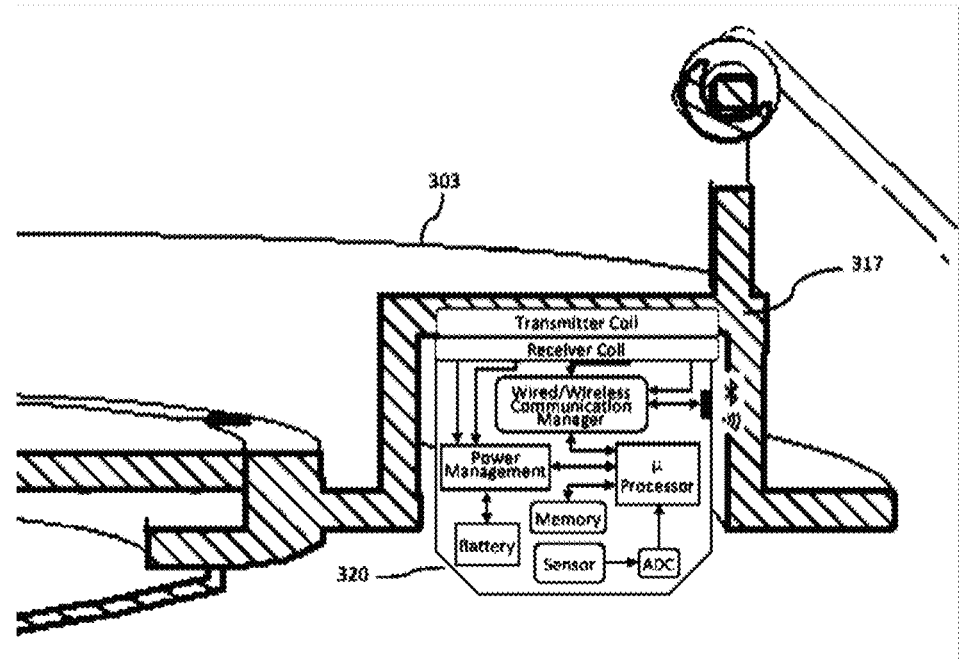
FIG. 3E3
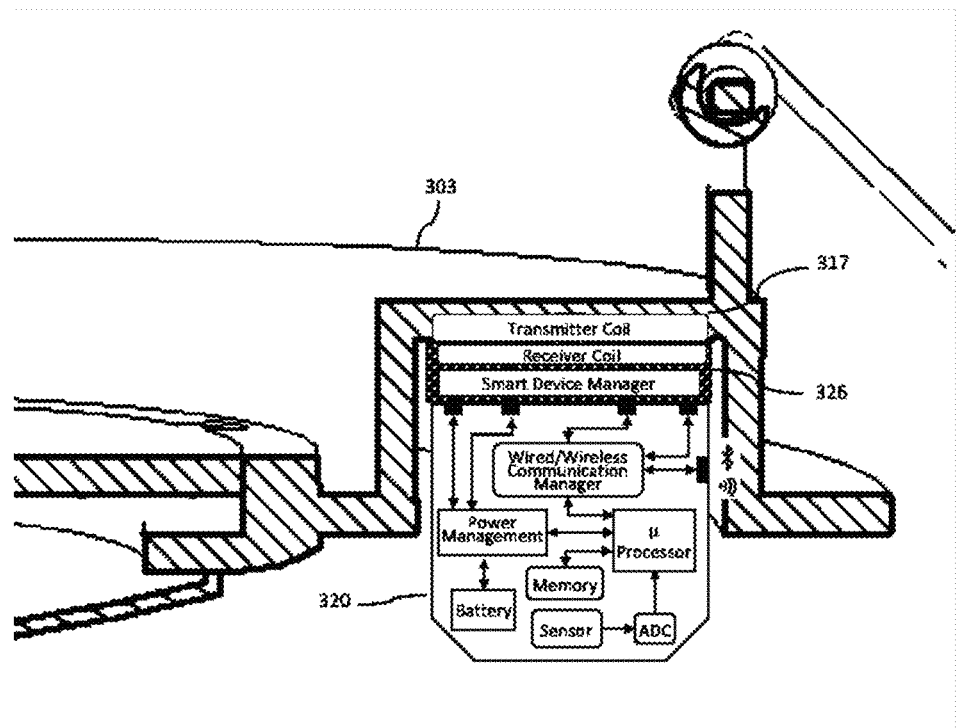
FIG. 3E4

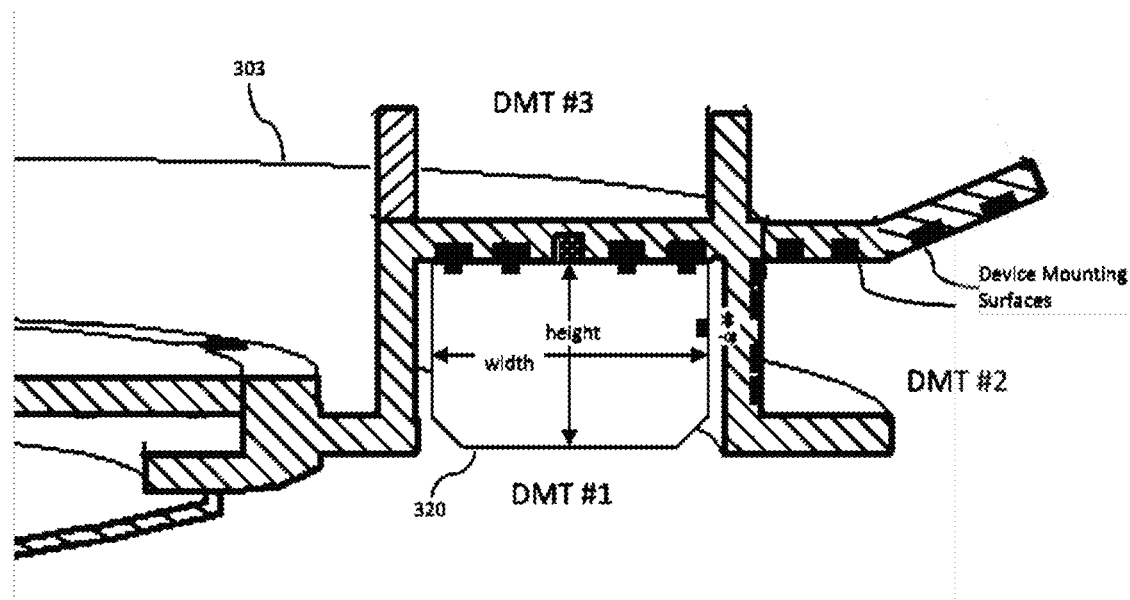
FIG. 3E5
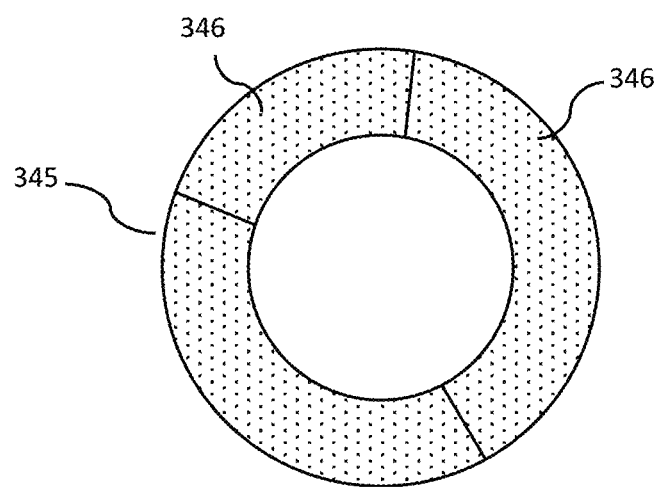
FIG. 3E6

SYSTEM AND METHOD FOR INTEGRATING SMART ELECTRICAL ELEMENTS

CROSS REFERENCE TO RELATED APPLICATION

The present application is a continuation-in-part of U.S. patent application Ser. No. 16/845,081, entitled "Smart Recessed Light", filed Apr. 10, 2020, now U.S. Pat. No. 11,732,850, issued Aug. 22, 2023, the disclosure of which is incorporated by reference in its entirety herein.

FIELD OF THE INVENTION

The present disclosure pertains to an apparatus, system, and methods for deploying and maintaining smart devices, specifically focusing on a smart lighting system. The scope extends beyond smart homes, encompassing smart buildings, smart cities, and other applications. The disclosure involves a collection of interconnected smart lighting systems and devices, along with methods for housing, powering, and managing these devices to carry out a diverse range of smart functions and tasks. The disclosure aims to provide comprehensive insights into the integration and utilization of smart devices within various environments.

BACKGROUND OF THE INVENTION

The rapid progress of internet technology, smart devices, and interconnected systems has brought about a significant transformation in the realm of smart homes, smart buildings, smart cities, and related environments. These advancements present a multitude of opportunities to improve automation and efficiency across different domains, including lighting control, audio and home entertainment, surveillance and security, HVAC (heating, ventilation, and air conditioning), appliances, motion detection, air quality monitoring, and hazard detection, among numerous others. The convergence of these technologies enables the creation of intelligent and interconnected ecosystems that enhance convenience, comfort, and safety for individuals and communities.

However, managing multiple smart devices from various manufacturers, each with its own distinct user interface, has become increasingly complicated. The absence of a centralized and standardized user interface presents challenges for users who desire to establish a unified smart home environment. Furthermore, the installation of smart devices can be both expensive and time-consuming, necessitating the laying of wires to and from each device, as well as the identification of suitable mounting solutions that do not compromise the aesthetic appeal of the space. Additionally, a notable issue is the lack of redundancy, where a single failure in the home environment, for example, can disrupt the operation of the entire system, compromising its reliability and functionality.

This invention effectively addresses these challenges by offering a lighting fixture or assembly that seamlessly integrates and manages a diverse range of smart devices, including a light assembly, an audio system, a surveillance and security system, sensors, data storage, and other attachments, in an organized, cohesive, and visually appealing manner to create a smart home, building, or city environment. By centralizing control over multiple devices, this invention simplifies the installation and management process, thereby reducing costs and saving time in integrating smart devices. Additionally, the invention's sleek design eliminates the need for unsightly wiring and mounting solutions, enhancing its aesthetic appeal and facilitating its seamless integration into any space.

SUMMARY OF THE INVENTION

The present invention revolves around the embodiment of lighting devices and lighting systems and provides an expandable fixture, system, and methods for accommodating and managing a plurality of smart devices. Lighting devices and lighting systems play an important role in modern life whether they are installed in homes, schools, offices, hospitals, airports, factories, vehicles, streets or parking lots and it's only instinctive to take advantage of their installation and infrastructure to extend their applicability beyond just illumination. The invention includes device mounting tracks of various shapes and sizes situated around the illuminating assembly to create an extension to the illuminating assembly and a smart device power and data centre.

In some embodiments, the invention incorporates a device mounting track that consists of multiple angled mounting surfaces joined together to form a housing. This housing includes at least one voltage rail and data rail, and is designed to be mechanically and electrically detachable from a variety of smart devices. The smart devices can connect with each other, with a smart hub, central server, or cloud-computing system to create a smart network that combines their functionalities. This network enhances automation in various domains, including lighting control, heating and cooling, surveillance and security, energy management, keyless entry, traffic management, navigation, public safety, air quality monitoring, communication, and numerous other aspects.

The lighting fixture and system are capable of housing and managing a diverse range of smart devices, including smart speakers, occupancy sensors, smoke detectors, smart doorbells, security cameras, data storage, battery packs, and various sensory systems. These smart devices enable functions such as temperature and humidity measurement, detection of hazardous situations like carbon monoxide (CO), and identification of noxious gases that can pose risks to humans, animals, and the environment. Furthermore, smart hubs and devices may incorporate support for communication using wired or wireless communication protocols, such as I2C, USB, Bluetooth, Wi-Fi, Zigbee, UWB, or Long Range Wide Area Network (LoRaWAN).

Another objective of the present invention is to extend the application of smart light systems beyond illumination by integrating not only electrical devices but also mechanical devices with moving components and electromechanical devices.

BRIEF DESCRIPTION OF THE DRAWINGS

The invention and certain embodiments thereof can be better understood by referring to the following figures:

FIG. 3C-3E4 illustrates a detailed view of a smart device installed in device mounting track, according to an embodiment.

FIG. 3E5 illustrates a light fixture with a plurality of device mounting tracks, according to some embodiments.

FIG. 3E6 illustrates an example embodiment of a track with compartmentalization.

FIG. 5 illustrates a network of smart devices, according to some embodiments.

FIG. 6 illustrates a network of smart systems, according to some embodiments.

DETAIL DESCRIPTION OF THE INVENTION

All illustrations of the drawings are for the purpose of describing selected examples of the present invention and are not intended to restrict the scope of the present invention.

The present invention provides a smart lighting fixture or system with various embodiments. It includes a device mounting track system for easy and flexible installation of smart devices, such as smart speakers, cameras, smoke detectors, sensors, and doorbells. The invention is not limited to any specific shape or type of lighting, and the device mounting track system can be integrated into the lighting system as one embodiment or installed as an add-on to existing lighting systems. This allows for the upgrade of existing lighting systems to a smart lighting system with added smart device capabilities.

Figure 1A:
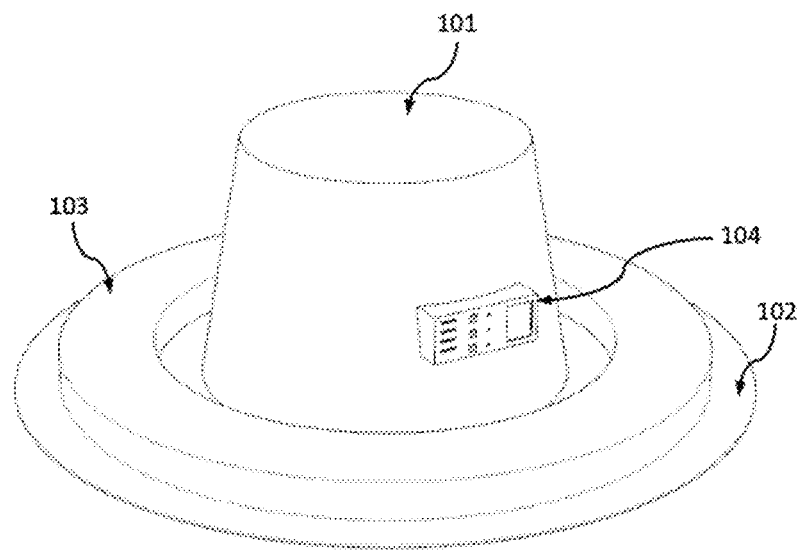
FIG. 1A-B depict a circular-shaped smart recessed fixture, as illustrated in an embodiment.
Figure 1B:
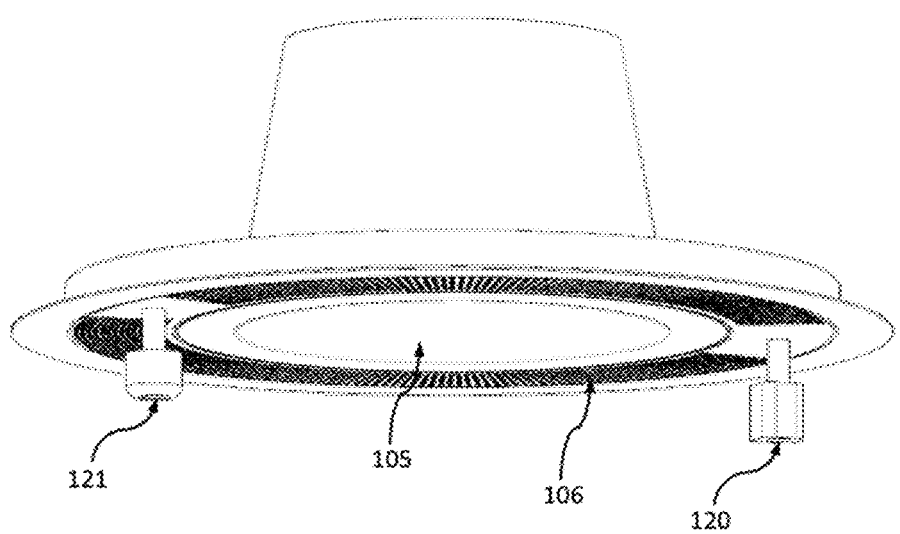

FIG. 1A-B illustrate an example of a circular smart recessed light assembly, consisting of a canister (101), trim (102), device mounting track system (103), smart hub (104), and light bulb (105) as its main components. The device mounting track system (103) includes a modular cover (106) that allows for the installation of devices to be hidden behind the cover, such as a smart speaker, or partially exposed, as with the CCTV camera (121) and smoke detector (120). The smart recessed light can be installed in both new and old constructions. In new construction, it can be installed like any other recessed light available in the market. In old construction, the current mounting surface opening is enlarged as needed, and a new smart recessed light is installed, utilizing existing power lines.

Figure 1C:
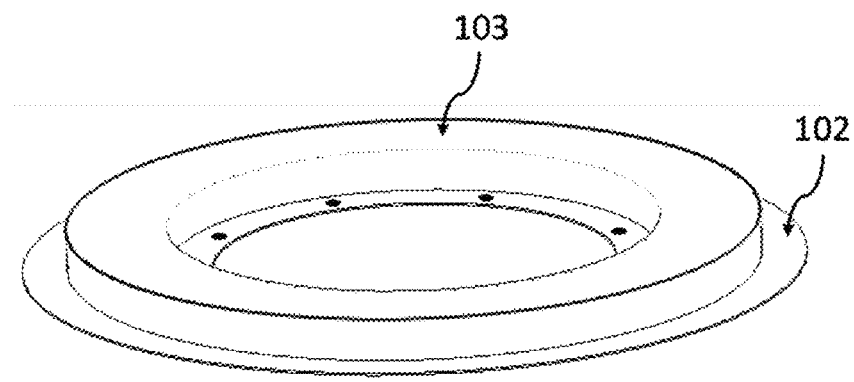
FIG. 1C-D depicts an embodiment of a device mounting track fixture that can serve as an add-on to existing recessed lights.
Figure 1D:
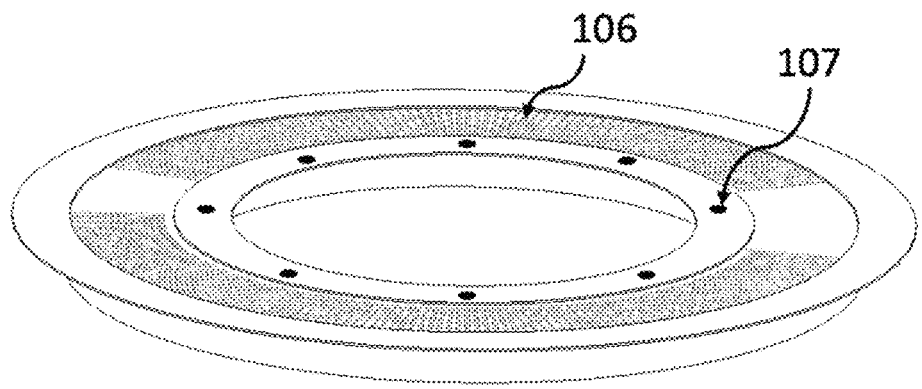

FIG. 1C-D illustrate an example of a device mounting track that can be added onto an existing illuminating assembly in the case of older construction. This add-on device mounting track can be installed by enlarging the current mounting surface opening and placing the device mounting track over the existing light canister (101) until its internal lip with holes (107) rests on the existing recessed light trim. Pre-drilled holes are then used to secure the add-on. Additionally, the device mounting track can be installed recessed into a mounting surface to create a seamless appearance and take advantage of existing power lines for easy and quick installation.

Figure 2:
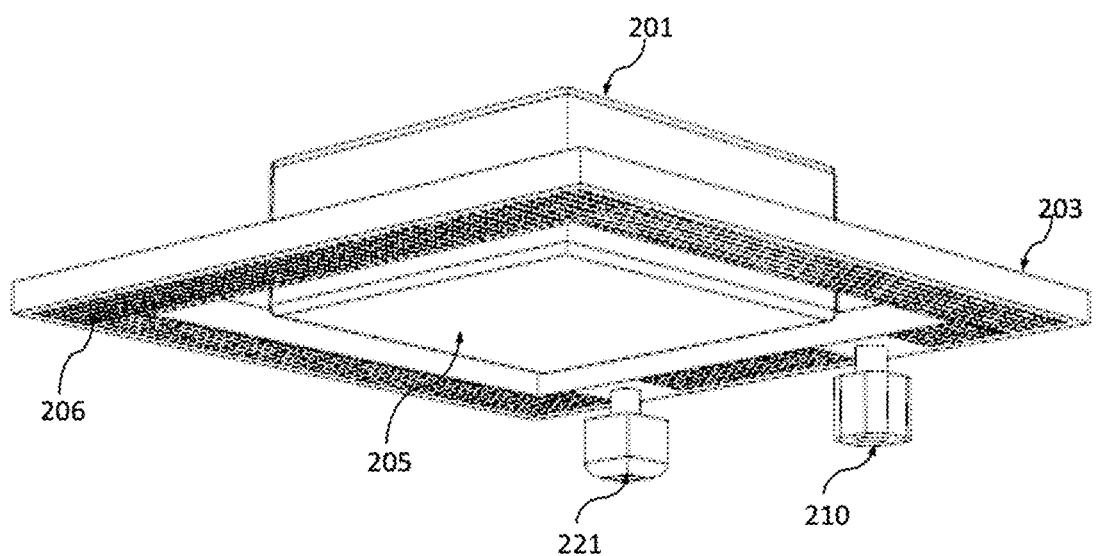
FIG. 2 illustrates a non-circular smart recessed fixture, according to an embodiment.

FIG. 2 illustrates an example of a non-circular smart recessed light assembly consisting of a canister (201), device mounting track system (203), trim (not shown), and a light bulb (205) as the main components. The device mounting track system (203) includes a modular cover (206) that provides the option to conceal certain devices, like a smart speaker (not shown), or partially expose devices such as the CCTV camera (221) and smoke detector (210).

Figure 3A:
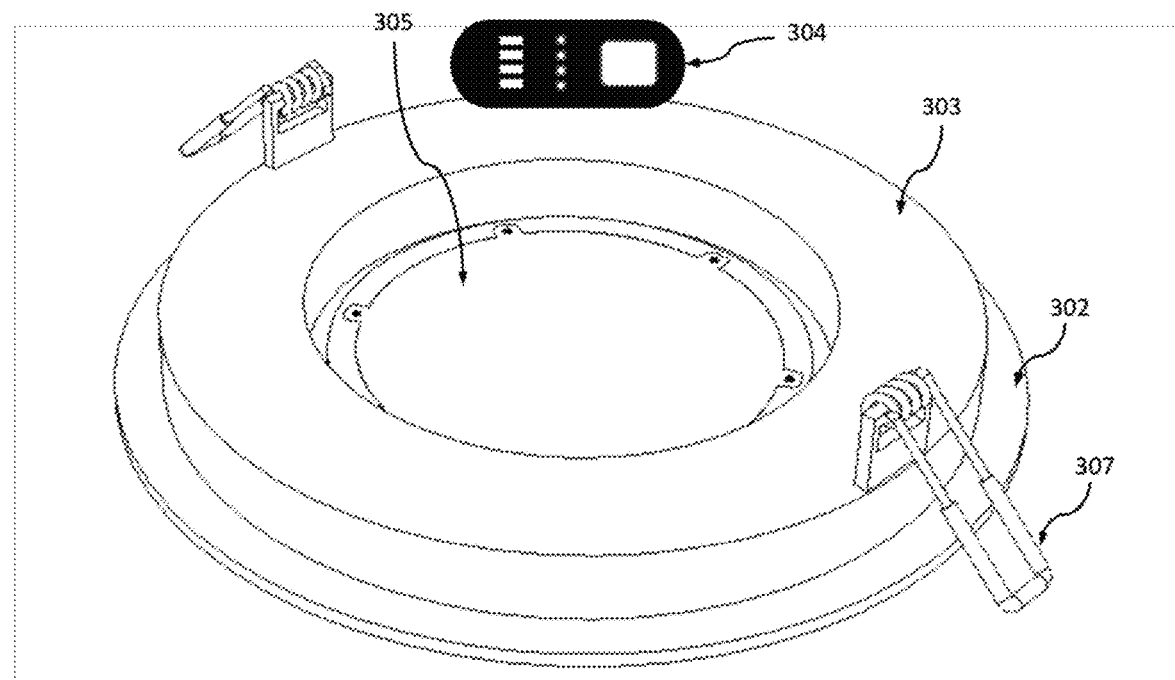
FIG. 3A illustrates an LED (Light Emitting Diode) based smart recessed light, according to an embodiment.

FIG. 3A illustrates an example of a smart LED recessed light assembly, consisting of a trim (302), device mounting track system (303), smart hub (304), LED-based light source (305), and mounting clip (307) as the main components. The LED recessed light is a canless alternative to the traditional canlight described above and illustrated in FIG. 1A. LED recessed lights are directly installed recessed into surfaces like ceilings or walls and do not require a housing or canister. They consume only a fraction of the energy compared to traditional canlight fixtures, making them highly energy-efficient and suitable for reducing energy consumption.

Figure 3B:
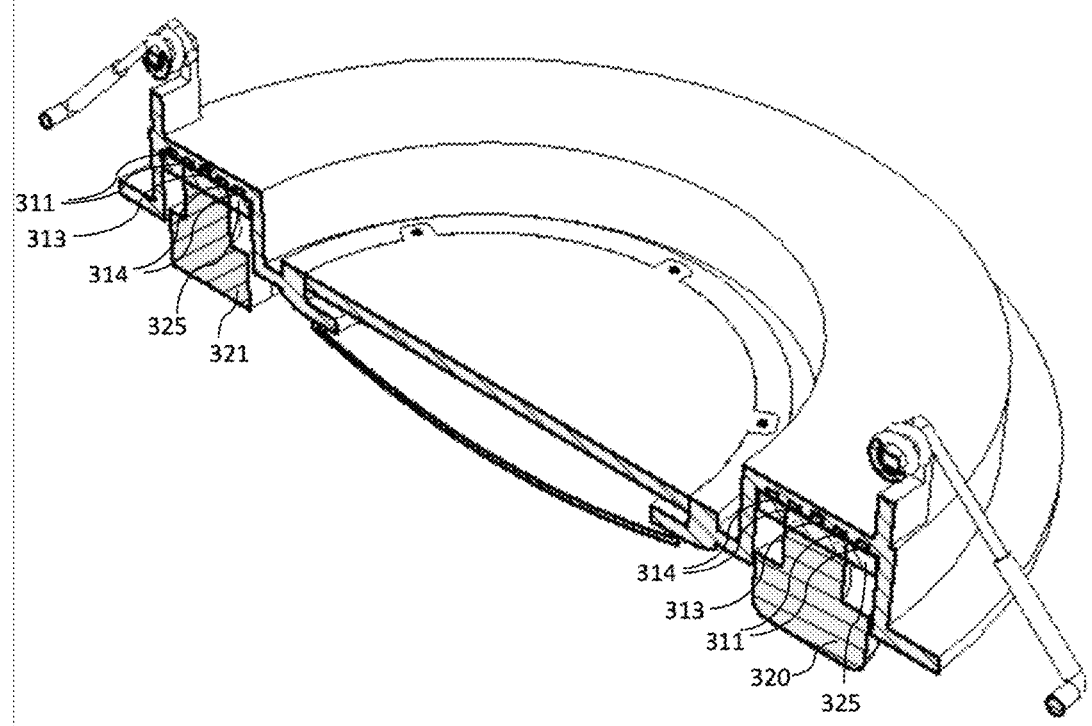
FIG. 3B presents a cross-sectional view of an LED-based smart recessed light, according to an embodiment.

FIG. 3B illustrates a detailed cross-section view of the LED smart recessed light, highlighting its key components. The recessed light includes a voltage rail (314) that supplies power to the smart devices installed within the light. A data rail (311) enables data communication between the connected smart devices and the smart hub. The device retainer tab (313) helps align and secure the smart devices in place. Smart devices represented by elements (320) and (321), such as sensors or cameras, can be installed within the light. The device manager (325) is responsible for managing and coordinating the functions of the smart devices within the light and communicating with the smart hub to exchange data and receive commands.

Figure 3C:
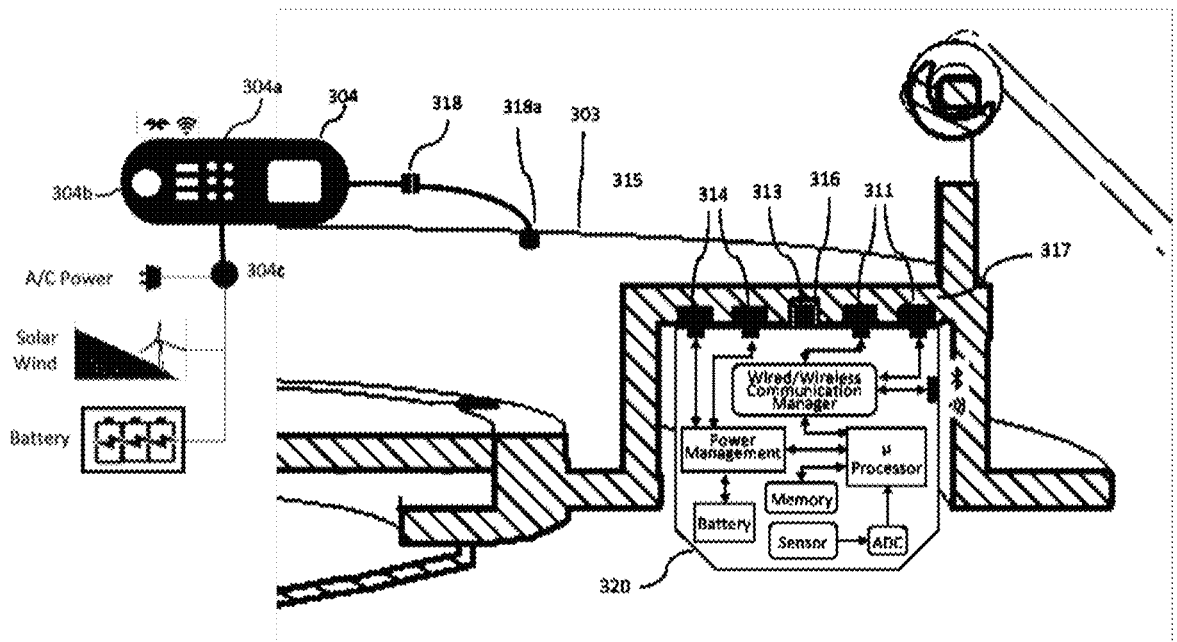

FIG. 3C-E5 and 4B, illustrate a cross-section view of the device mounting track, showcasing how smart devices (320, 321) can be installed in various lighting embodiments. The device mounting track comprises one or more voltage rail system (314) and one or more data rail/bus system (311). These systems facilitate the mechanical and electrical connection of smart devices to the device mounting track, allowing power and data connections to be established via the voltage and data rails, respectively. The device mounting track is versatile and can be installed in diverse lighting embodiments, including those for homes, schools, offices, hospitals, airports, factories, vehicles, streets, or parking lots, thereby extending the advantages of smart technology to a wide range of applications.

In addition, the voltage and data rail conductors can be mounted directly on the insulative surfaces of the device mounting track system or on a separate insulative structure that is then attached to the mounting surface (317). The voltage rail system provides a low voltage supply to the smart device(s) power pins, while the data rail serves as a physical bus system, facilitating communication between nodes on the device mounting track system through various physical communication interface standards like I2C or USB. Moreover, the voltage and data rail conductors can be mounted on any combination of mounting surfaces, as illustrated in FIG. 3E5 and FIG. 4E, to optimize the positioning, functionality, and performance of the smart device(s). This flexibility in mounting options allows for greater customization and adaptation to different installation scenarios. For example, in FIG. 4E, a camera (461) can be installed raised above the device mounting track using an extension, or it can be installed into a side device mounting track, as illustrated by camera (460). Additionally, each device mounting track (DMT) can vary in height and width to accommodate different sizes and types of devices, ensuring a flexible and versatile installation. The device mounting track system can be used in a wide range of applications, from home and building lighting to street, parking, and public lighting, providing the benefits of smart technology to various lighting scenarios.

Figure 6:
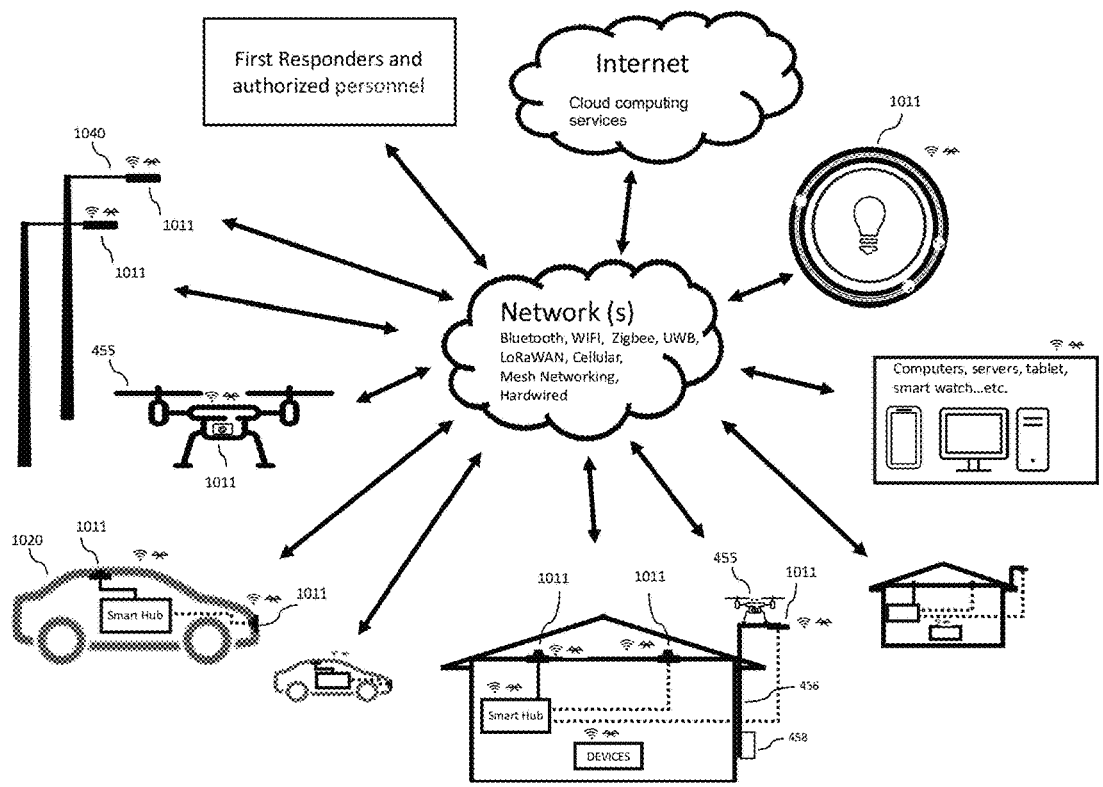

In some embodiments, as depicted in FIG. 3E6, the device mounting track (345) incorporates a flexible and compartmentalized (346) design that is particularly important in public settings such as streetlights and even some private settings. This design allows for customizable arrangements and organization of interconnecting devices while offering additional security features. The compartmentalization feature provides several benefits and advantages, including but not limited to:
  a. Each compartment can be assigned different owner access levels, enabling restricted access to specific interconnecting devices based on user permissions. This feature is crucial in public settings to ensure that only authorized individuals have the ability to interact with certain devices, enhancing security and protecting against unauthorized tampering or manipulation.
  b. Certain compartments may feature a secondary, hard-to-open cover that requires a special key for removal. This additional security measure provides tamper-evident features and ensures the integrity of the devices housed within the compartment. Unauthorized access and tampering are further prevented, enhancing the overall security of the interconnected system.
  c. The compartments within the device mounting track allow for the organization of devices based on their characteristics, such as heat dissipation. This enables optimal placement of devices within the compartments, promoting efficient operation and minimizing the risk of overheating. Grouping devices with similar heat dissipation requirements ensures that they can function optimally without affecting the performance of other devices in the system.
  d. Selected compartments can be designed to incorporate active or passive heating and cooling elements, facilitating temperature regulation to maintain optimal conditions for the interconnecting devices. This temperature control feature is particularly important in environments where temperature fluctuations can impact device performance. By providing a controlled and stable temperature environment, the devices' longevity and overall functionality are preserved.

The customizable compartmentalization feature of the device mounting track offers flexibility, adaptability, and enhanced security, making it ideal for public settings like streetlights and other applications where additional protection is required. Whether it is assigning access levels, employing tamper-evident measures, organizing devices based on characteristics, or regulating temperature, the compartmentalization feature provides a versatile solution for organizing and securing interconnecting devices in various settings.

In some embodiments, the smart hub (304) is designed to receive power from various sources (304c) such as AC power, DC power, batteries, or renewable energy like solar and wind power. The smart hub is designed to switch to alternative power sources in situations where the primary power source is unavailable. For example, when AC power is unavailable, the smart hub can seamlessly transition to solar or stored power. Additionally, the smart hub may be equipped with a voltage regulator to ensure a stable and steady supply of DC power. This regulated power can be connected to the voltage rails within the device mounting track, providing reliable power to the smart devices installed in the lighting system. In one embodiment, power and data wires/connections can extend from the smart hub through its I/O port or be directly wired to internal components within the hub. These wires/connections can then be routed through a connector and hole, such as connector (318) and hole (318a), to reach the data and voltage rails in the device mounting track. This setup enables efficient power and data distribution throughout the system, ensuring proper functionality and communication between the smart hub and the connected devices.

Figure 3D:
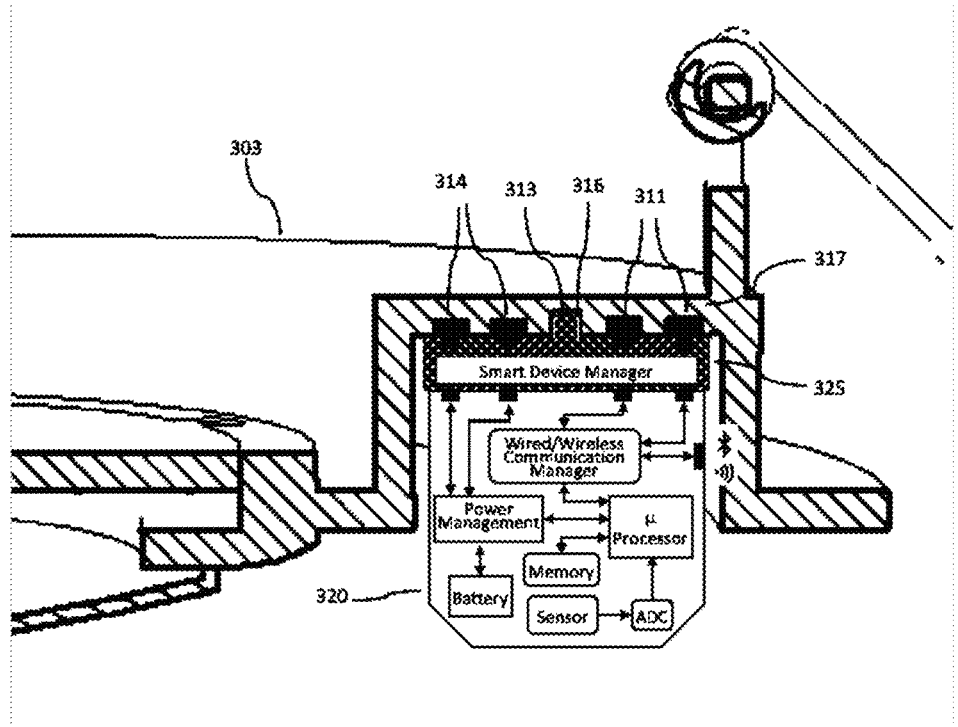

In the embodiment illustrated in FIG. 3D. smart devices may be connected to the device mounting track indirectly through a smart device manager (325), which is physically and electrically detachable from the device mounting track. The data pins of the device manager are connected to the rail/bus of the device mounting track, while its power pins are connected to the voltage rail of the track. Similarly, the data pins of the smart device are linked to the data pins of the device manager, and its power pins are connected to the power pins of the device manager. The device manager assumes various roles in relation to the installed smart devices. For instance, it can facilitate the alignment of physical and electrical connections between a smart device and the device mounting track when they are not directly compatible. Furthermore, the device manager can function as a DC to DC converter when the power specifications of the smart device do not match those of the voltage rail. Another role of the device manager could involve converting an analog signal from a sensor into a digital value and transmitting it wirelessly or via a physical bus to other devices.

In another embodiment illustrated in FIG. 3E1-2, wireless power and charging of smart devices are achieved by utilizing technologies such as near-field inductive coupling. The device mounting track includes a transmitter coil that generates a magnetic field, which in turn induces an electric current in the receiver coil located on either the smart device itself (FIG. 3E1) or the smart device manager (FIG. 3E2). This electric current can be harnessed to power and charge the smart device without the need for physical connection or cables. Simultaneously, the data rail and wireless module enable communication and data transfer between the smart device within the device mounting track or other devices within the network.

In yet another alternative embodiment illustrated in FIG. 3E3-4, the use of wireless power and communication can eliminate the need for physical connections altogether, improving the overall durability and reliability of the system and making it more suitable for outdoor settings such as streetlights and parking lot lights. Furthermore, wireless technology can simplify the installation and maintenance process.

In certain embodiments, the device mounting track incorporates magnetically coupleable retainer tabs and receptacles, which serve to facilitate the installation of smart devices, ensure accurate alignment, and provide secure attachment when mechanically coupled to the track. Additionally, in some embodiments, smart devices may be further secured to the device mounting track using additional mechanical retainers like clips and screws. It is important to note that the coupling between smart devices and the device mounting track can be purely mechanical without electrical connections, or it can involve both mechanical and electrical coupling, depending on the specific system requirements.

Figure 3F:
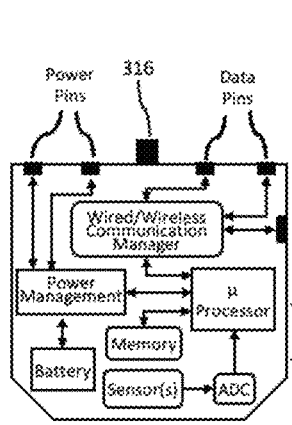
FIG. 3F illustrate block diagram representing a smart sensor, according to some embodiments.
Figure 3G:
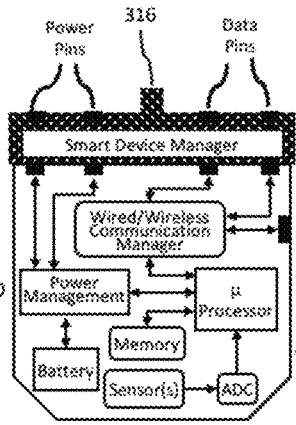
FIG. 3G illustrate block diagram representing a smart sensor, according to some embodiments.
Figure 3H:
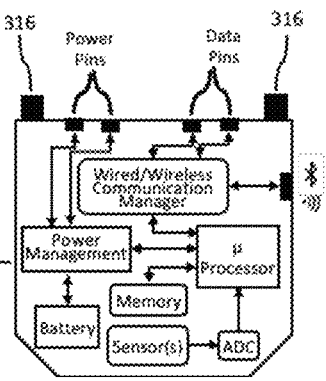
FIG. 3H illustrate block diagram representing a smart sensor, according to some embodiments.

An embodiment of the present invention is depicted in FIG. 3F-H, which illustrates block diagrams of multiple instances of sensory systems capable of measuring temperature, humidity, ambient light intensity, as well as detecting motion or hazardous situations in residential or commercial environments, or in the surrounding air. In FIG. 3F, a generic sensor (320) is presented, featuring various modules that can be mounted onto a printed circuit board (PCB) and preloaded with operational software. The sensor can be enclosed within a cover (not shown) to fulfill different functions and tasks. These tasks may encompass an analog-to-digital converter module (ADC), a memory module, and a local rechargeable battery to provide power to the device in case the main power source is unavailable. The sensor (320) can be powered wirelessly or via the voltage rail (314), and its battery can be recharged as necessary when electrically coupled to the device mounting track.

Figure 3I:
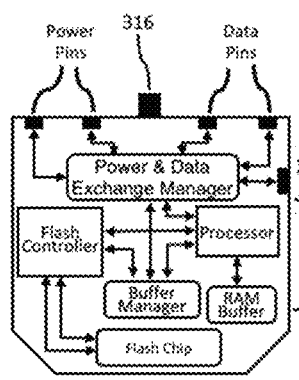
FIG. 3I illustrate block diagram representing a data storage, according to some embodiments.

In the embodiment illustrated in FIG. 3I, a data storage device (322) is included, which can take the form of a solid-state drive, a hard disk drive, or any other suitable type of storage device. This data storage device is integrated into a light fixture, specifically in situations where there is a need for substantial real-time data processing, transfer, and storage. By incorporating a data storage device within the light fixture, the smart network system can efficiently handle and manage large volumes of data generated by various devices and sensors within the network. This enables real-time data analysis, storage, and retrieval, supporting the overall functionality and performance of the smart network system. The data storage device (322) comprises various components such as a microprocessor, a power and data exchange manager, a flash chip, and other modules mounted on a printed circuit board (PCB) and preloaded with operational software. It is enclosed within a cover (not shown) to fulfill various functions and tasks. In an alternative embodiment, the data storage device (322) can be indirectly connected to the device mounting track via a smart device manager (325). The smart device manager can oversee the data storage device and how stored data is shared with smart hubs, other devices, and the cloud. Additionally, it can serve as a secondary security layer by encrypting data or disabling/deactivating the data storage device (322) in the event of a threat detection. The data storage device (322) can communicate and exchange data with other devices using any wired or wireless communication protocol, including but not limited to serial bus USB, WiFi, Zigbee, or LoRaWAN.

Figure 3J:
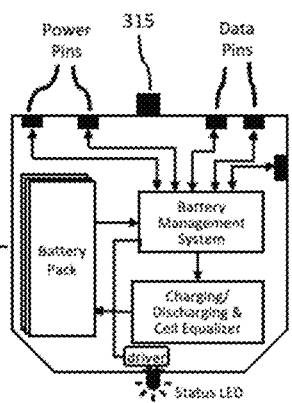
FIG. 3J illustrate block diagram representing a battery pack, according to some embodiments.

In certain embodiments, one or more battery packs can be installed in the device mounting track to serve as a secondary power source for smart devices in the event of a primary power failure or unavailability. For instance, FIG. 3J depicts a battery pack device (323) that may include a battery management system module, a charging/discharging status LED, and one or more rechargeable batteries. These components are mounted on a printed circuit board (PCB), preloaded with operational software, and enclosed within a cover (not shown) to fulfill various functions and tasks. The LED provides information regarding the current state of the battery, while the battery management system ensures optimal charging and discharging of the batteries. Furthermore, the battery pack can be charged using a main power source or renewable energy systems, enabling it to serve as a sustainable backup power solution.

Figure 3K:
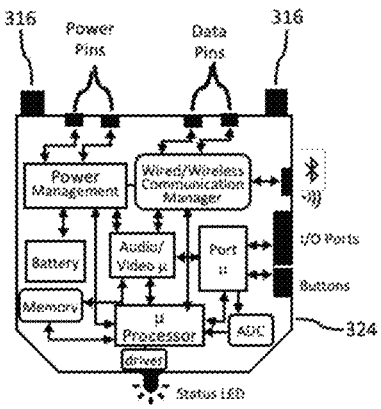
FIG. 3K illustrate block diagram representing a smart hub, according to some embodiments.

In an alternative embodiment depicted in FIG. 1A and 3A, the smart hub can be installed within the device mounting track, similar to other smart devices. In this configuration, the smart hub (324) of FIG. 3K is physically and electrically removably coupled to the device mounting track. It comprises multiple modules mounted on a printed circuit board (PCB), preloaded with operational software, and enclosed within a housing (not shown) to fulfill various functions and tasks. These tasks may include monitoring connected smart devices, managing and organizing data from the connected devices, providing a user interface for controlling the smart devices, and facilitating communication with other smart hubs, a central server, or a cloud-computing system to establish a comprehensive smart network that integrates their functionalities. The smart hub may feature one or more push buttons, with one button dedicated to powering the smart hub on or off. Additionally, the smart hub may incorporate an I/O (input/output) processor along with associated ports. It may employ an analog-to-digital converter module (ADC) to convert analog data received from external devices, such as temperature sensors, humidity sensors, or photocells, via the I/O ports into digital format for processing. Furthermore, the smart hub may include one or more USB ports to facilitate connectivity. Visual indicators can be employed by the smart hub to provide feedback to the user during installation, normal operation, or in the case of a malfunction, as well as to draw the user's attention when action needs to be taken. These indicators may take the form of LEDs accompanied by displayed messages or audible sounds.

Figure 3L:
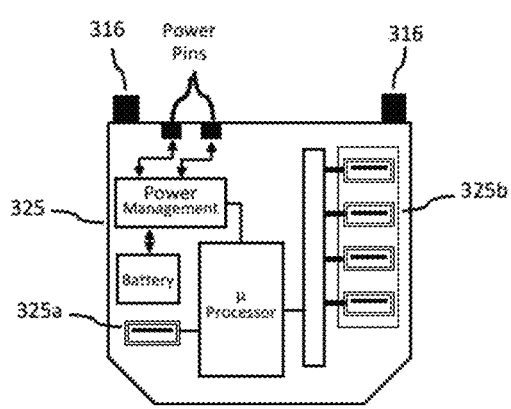
FIG. 3L illustrate block diagram representing a USB hub, according to some embodiments.

In certain embodiments, as depicted in FIG. 3L, a USB hub is utilized to enable the connection of multiple USB devices to a host device, such as the smart hub (324). This configuration allows for the integration of various devices, including cameras, smart speakers, temperature sensors, doorbells, and data storage devices, to the smart hub via a single USB connection. The USB protocol provides a convenient plug-and-play interface for adding and connecting such devices to the smart hub. The USB hub (325) of FIG. 3L comprises multiple modules mounted on a printed circuit board (PCB), preloaded with operational software, and enclosed within a cover (not shown) to fulfill various functions and tasks. These tasks may include signal routing, data communication, and power distribution to the connected USB devices. The USB hub can also be physically and electrically removably coupled to the device mounting track, providing flexibility in its installation and configuration.

Figure 4A:
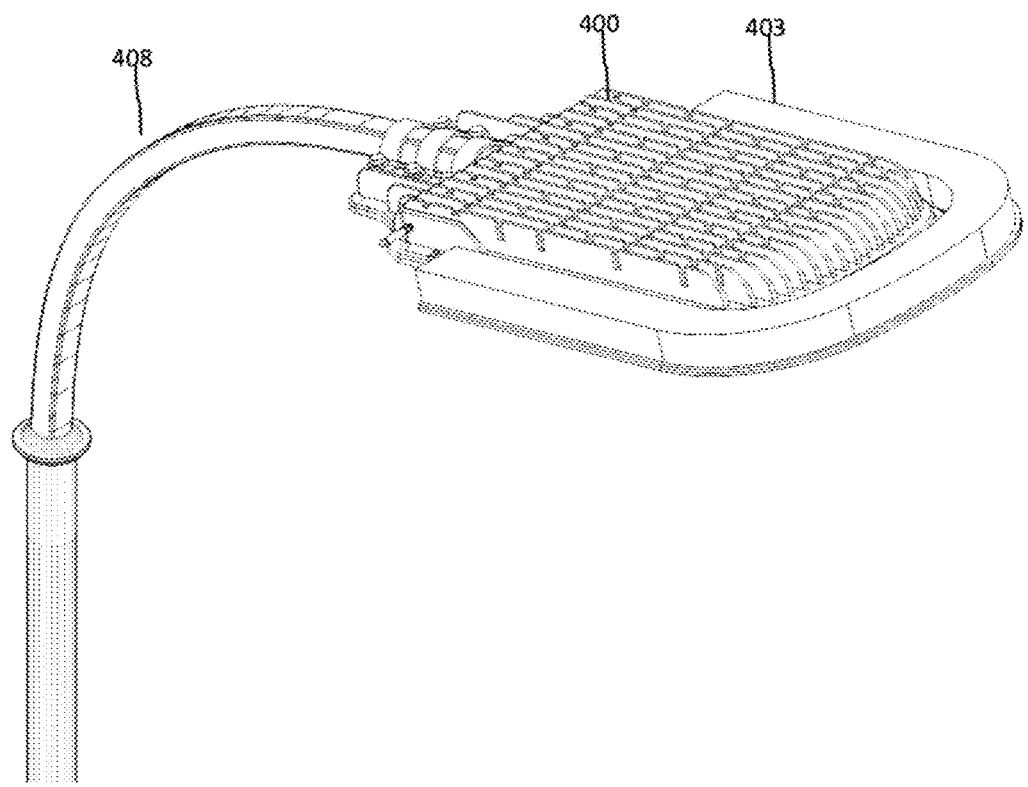
FIG. 4A illustrates an LED based smart street or parking lot light, according to some embodiments.
Figure 4B:
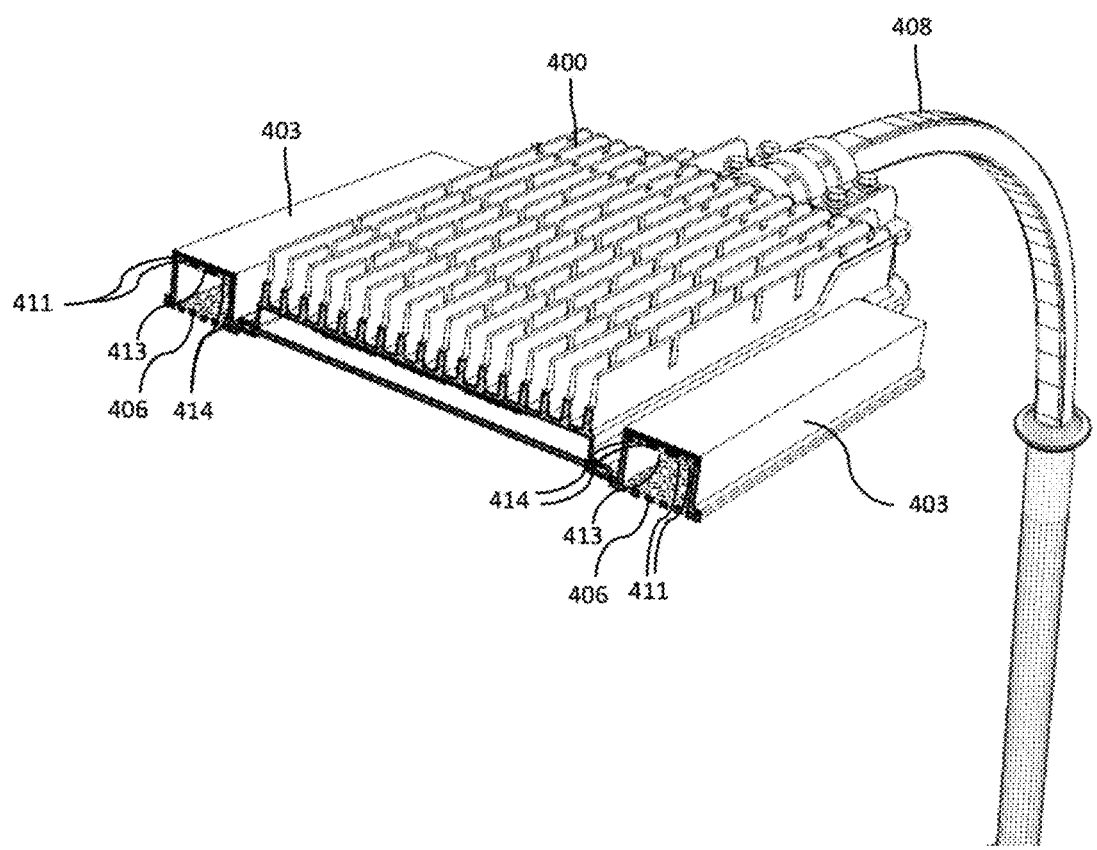
FIG. 4B illustrates a cross-sectional view of an LED based smart recessed light, according to some embodiments.
Figure 4C:
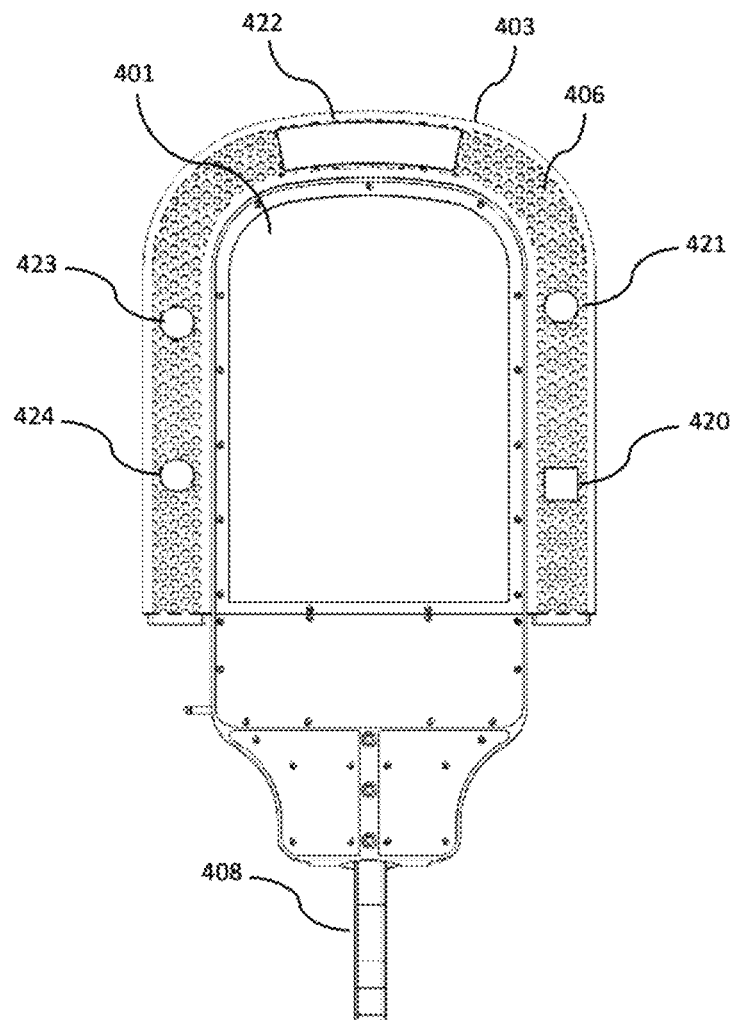
FIG. 4C illustrates an LED based smart street or parking lot light, according to some embodiments.

The scope of the present invention also encompasses smart street lights that incorporate a device mounting track, allowing for seamless integration of smart devices and smart hubs, as depicted in FIG. 4A-C. The street light assembly, according to one embodiment, consists of common components such as a light source housing (400), a light source (401), a device mounting track (403), and a light pole (408). In FIG. 4B, a cross-section of the smart street light assembly is shown, highlighting the capability for data connections through data rails/buses 411 and power connections via voltage rails 414. The device mounting track (403) is equipped with a modular cover (406) that can either conceal smart devices like a battery pack (422) and a data storage device (420), or expose devices such as a camera (421), a motion sensor (423), and an air quality sensor (424). Communication between these devices can be facilitated using a variety of wired or wireless protocols, including I2C, USB, Bluetooth, WiFi, Zigbee, UWB, or LoRaWAN. Integrating smart devices into street lights enables enhanced data collection and analysis for diverse applications, such as traffic management, public safety, and energy efficiency. The smart hub can analyze the collected data to help in making informed decisions regarding traffic signal timing, public safety measures, and energy consumption of the street light. This results in improved traffic flow, reduced energy usage, and increased safety for pedestrians and drivers.

In certain embodiments, as depicted in FIG. 5, a smart network system is illustrated where multiple devices are interconnected with each other. This interconnected network enables seamless communication and collaboration among the devices, enhancing their combined functionalities to perform various smart functions and tasks. At the core of the system is the smart hub, which acts as a central control point, facilitating the exchange of data and commands between the devices within the network, enabling coordination and intelligent operation. The smart hub serves as a communication bridge, allowing the devices to share information, synchronize their actions, and work together efficiently. The interconnected devices in the smart network system can include various components such as dedicated smart bulbs, smart speakers, smart switches, motion sensors, and other smart devices. The integration of the smart network system with a central server or cloud computing system further enhances its capabilities. The central server or cloud computing system can provide advanced processing power, storage, and data analytics, enabling sophisticated control, monitoring, and automation of the network. It allows for the collection and analysis of data from the devices, facilitating intelligent decision-making and adaptive behavior. The smart network system can find applications in various settings, including smart homes, smart buildings, smart city, and smart vehicles. By leveraging the connectivity and interplay among the devices, the system can provide enhanced lighting control, energy efficiency, and automation, resulting in improved user experience and convenience. Overall, FIG. 5 demonstrates the interconnected nature of the smart network system, highlighting its ability to combine and utilize the functionalities of multiple devices and its integration with a central system to achieve enhanced intelligence and performance.

In certain embodiments, as depicted in FIG. 5-6, the smart network interconnects with external smart networks, systems, and platforms, such as cloud platforms, home and building automation systems, city automation systems, vehicles, IoT platforms, enterprise networks, handheld devices, computers, and other compatible systems. This integration enables secure and efficient data exchange, synchronization, and interoperability across diverse domains, enhancing control, monitoring, and management capabilities for improved efficiency and effectiveness, including setup and configuration processes.

In certain embodiments, as depicted in FIG. 5-6, the smart hubs can be configured to grant some users administrative access, allowing them to use interfaces such as computers or handheld devices to conveniently set up, manage, and monitor various aspects and parameters within the smart network. By providing comprehensive control and oversight, this configuration empowers the network owner to efficiently manage and optimize the functionality and operations of the smart network, ensuring a seamless and personalized user experience.

In certain embodiments, as depicted in FIG. 5-6, the smart hub can also be configured to grant some users non-administrative access, allowing them to use interfaces such as computers or handheld devices to conveniently access and control specific aspects and parameters of the smart network, interact with and customize predefined features within designated boundaries. This level of access ensures a degree of personalization and flexibility while maintaining the overall integrity and security of the smart network.

In certain embodiments, FIG. 3K illustrates a dedicated smart hub specifically designed to interconnect with various feedback devices and sensors, as well as actuation devices such as actuators, motors, and valves. These dedicated smart hubs, including the security hub, climate control hub, irrigation hub, leak detection hub, and structural monitoring hub illustrated in FIG. 5, can be conveniently mounted in a device mounting track, enabling seamless wireless communication and integration with feedback and actuation devices. For example, the security hub can communicate and integrate with a plurality of doors and windows sensors, monitoring when a door or window is opened or closed. Additionally, it can integrate with actuation devices such as smart door locks, enabling keyless entry and remote control of door access. The irrigation hub can seamlessly communicate and integrate with a variety of sensors, including those embedded in the soil to measure humidity levels in various settings such as home gardens, public parks, or farm fields. This data can be utilized for various purposes, including optimizing irrigation systems. The leak detection hub can seamlessly communicate and integrate with a variety of sensors placed throughout a house, building, or underground within city infrastructure to detect water leaks. The methods employed can include monitoring water flow rates, pressure changes, or the presence of moisture in specific areas. When a leak is detected, the hub can trigger alerts and take action, such as shutting off the smart water valve/supply and notifying maintenance personnel. The climate control hub serves as a central point of communication and integration for various climate control devices, enabling seamless coordination and control. It can effectively connect and interface with a range of devices, including smart thermostats and motors used for opening or closing blinds, among others. For instance, the climate control hub can receive inputs from one or more smart thermostats, which monitor and regulate the temperature in different zones or rooms. Based on these inputs, the hub can analyze the data and send commands to adjust the heating or cooling systems accordingly. Additionally, the integration with motors for blinds or shades enables the climate control hub to manage natural lighting to a desired conditions. The structural monitoring hub can seamlessly communicate and integrate with a range of structural health monitoring sensors, such as accelerometers, strain gauges, load cells, and crack detection sensors. These sensors provide valuable insights into the structural integrity of buildings and structures. The hub can analyze real-time data from these sensors to assess structural conditions, detect signs of deterioration or stress, and trigger alerts or maintenance actions when necessary. By integrating with both feedback devices and actuation devices, these dedicated smart hubs enhance the functionality and automation of various aspects within their respective domains, improving convenience, efficiency, and safety in homes, buildings, cities and beyond.

In one embodiment illustrated in FIG. 5, the smart network system represents a comprehensive smart lighting system that goes beyond traditional lighting control. It incorporates several components, including a smart hub, smart bulbs, smart switches, motion sensors, and a smart speaker with a voice assistant. Together, these components create a seamless and intelligent lighting experience. The smart hub serves as the central control point for the lighting system, allowing users to connect and manage the various smart devices. It can be linked to a handheld device such as a smartphone or tablet, providing users with the ability to configure different scenarios and routines that enhance convenience and energy efficiency. With the smart lighting system, users can schedule lighting to automatically turn on and off at specific times, simulating occupancy and providing a sense of security. Additionally, motion-activated lighting is a feature that utilizes motion sensors to detect movement in specific areas of the house or building, automatically turning on the lights. This functionality improves convenience and safety by providing illumination when and where it is needed without manual control. Voice-activated control is facilitated by the smart speaker with a voice assistant. Users can conveniently command the lights using voice prompts, such as turning them on or off, adjusting brightness levels, or activating specific lighting scenes. The system also supports geo-fencing, which allows users to configure their mobile devices to trigger lighting actions based on their proximity to the home or building. For example, the lights can automatically turn on as the user approaches the front/main door, creating a seamless lighting experience upon arrival. Once scenarios and routines are configured, the smart hub executes them, providing personalized lighting experiences tailored to the user's preferences and needs. This intelligent and interconnected lighting system enhances convenience, energy efficiency, and security within the smart home environment. Overall, the embodiment depicted in FIG. 5 demonstrates the integration of multiple components to create a smart lighting system that enhances the user experience and offers advanced functionalities for personalized and automated lighting control within the smart home setting. However, it is important to note that this smart lighting system is not limited to the home environment alone. It can also be adapted to other environments, such as offices, schools, hospitals, airports, factories, vehicles, streets, or parking lots.

In another embodiment illustrated in FIG. 5, the smart network system represents a comprehensive smart security system that expands the smart network capabilities beyond traditional lighting control. It incorporates several components, including a smart hub, smart bulbs, high-definition cameras, motion sensors, a smart speaker with a voice assistant, and doors and windows sensors. Together, these components create a seamless and intelligent security system that enhances the safety and protection of homes, buildings, and beyond. The smart hub serves as the central control point for the security system, allowing users to connect and manage the various smart devices within the system, providing a convenient and user-friendly interface. The smart hub can be accessed and controlled through a handheld device such as a smartphone or tablet, enabling users to monitor and adjust the security system parameters remotely. High-definition cameras are an important component of the smart system embodiment illustrated in FIG. 5. The placement of the cameras takes advantage of the strategic positioning of light fixtures within the home or building, ensuring optimal coverage and visibility in key areas, maximizing the effectiveness of the surveillance system. By inheriting the light fixture placement, the cameras can capture well-lit video footage, even in low-light conditions or at night. By integrating the cameras with the smart hub, users can remotely access the camera feeds and monitor their property in real-time, regardless of their location. This remote access feature provides owners with enhanced security and peace of mind, as they can keep an eye on their property at all times, even when they are away. Additionally, the camera footage can be stored in the internal memory of the cameras, on a separate local data storage device, or in the cloud. This allows owners to review the recorded footage at a later time, which can be helpful for investigating incidents or providing evidence if needed. Motion sensors play a crucial role in the security system by detecting movement within specified areas. When motion is detected, the system can trigger various actions, such as activating the cameras to record, sending push notifications to the owner's device, flashing a light, or triggering audible alarms. This immediate response helps to alert owners to potential threats and ensures prompt action can be taken. Doors and windows sensors add an extra layer of security to the smart home or smart building system. These sensors can detect the opening or closing of doors and windows, allowing owners to monitor and control access points. When integrated with the smart lighting system, these sensors can trigger specific lighting actions when doors or windows are opened or closed, further enhancing security measures. The smart speaker with a voice assistant serves as a central control point for the security system, enabling homeowners to conveniently manage and control various security features through voice commands. This hands-free control allows for easy arming and disarming of the security system, controlling lighting scenarios, and even establishing two-way communication with unexpected visitors on the property. Furthermore, it is important to note that the discussed security system can also be applied to other environments where indoor and outdoor lighting systems are installed. The integration of high-definition cameras with the smart hub extends beyond just residential homes and can be implemented in various settings such as commercial buildings, public spaces, or any location where a smart lighting system is in place.

In an embodiments illustrated in FIG. 5, the smart network system represents a comprehensive smart lighting system that extends beyond traditional lighting control. This embodiment incorporates a smart RFID (Radio Frequency Identification) hub to integrate RFID technology into the system. This smart RFID hub serves as a centralized device for managing and handling RFID tags within the smart lighting system. It is responsible for reading and processing the information from the RFID tags, enabling tracking and identification of objects or individuals. RFID technology offers numerous applications and benefits and healthcare industry particularly is one of them. By employing RFID technology, hospitals can drive significant benefits, including:

1. Patient Tracking: RFID tags attached to patient wristbands or ID badges allow for accurate and real-time tracking of patients within the hospital. This enhances patient safety, facilitates efficient patient flow management, and enables quick identification during emergencies.
2. Asset Management: RFID tags affixed to medical equipment, devices, and supplies enable real-time tracking, inventory management, and optimization of asset utilization. This improves resource allocation, reduces equipment loss, streamlines maintenance processes, and ensures availability when needed.
3. Medication Management: RFID technology enhances medication management processes by enabling automated tracking and verification of medication throughout the administration workflow. This improves medication safety, reduces errors, enhances inventory control, and ensures proper medication administration to patients.
4. Blood and Tissue Tracking: RFID tags attached to blood bags, tissue samples, and biological materials enable accurate tracking and tracing throughout their lifecycle. This enhances patient safety, minimizes the risk of misplacement or loss, and ensures compliance with storage and handling requirements.
5. Staff and Visitor Management: RFID tags facilitate staff and visitor identification, access control, and attendance tracking. This improves security, enables efficient access management to restricted areas, and simplifies attendance recording for staff.
6. Supply Chain Management: RFID technology streamlines supply chain operations by enabling automated inventory tracking, stock replenishment, and expiration date monitoring. This enhances inventory management, reduces stockouts, minimizes wastage, and optimizes supply chain logistics.

RFID technology is also widely used in libraries for efficient management of books and resources. By employing RFID technology in libraries, benefits can include 1. Library Management: RFID tags on books and materials enable automated check-in and check-out processes, inventory management, and efficient shelving
2. Anti-Theft and Security: RFID tags enable library security systems to detect unauthorized removal of items, enhancing theft prevention and security.

These are just a few examples of the diverse applications of RFID technology in different industries, showcasing its versatility and potential for optimizing processes and enhancing overall performance.

In In In an embodiment illustrated in FIG. 5, the smart network system represents a comprehensive smart lighting system that extends beyond traditional lighting control. This embodiment incorporates a smart transcription hub, a smart speaker, and data storage to enable the recording of conversations in real time or the uploading of pre-recorded audio files, such as those from a personal recorder, for organized storage. The system is specifically designed to facilitate recording in various settings, including hospital rooms, where doctor-patient conversations can be captured for transcription at a later time. To initiate the recording process, users have the option to utilize either the built-in microphone of the smart speaker or a remote microphone equipped with control buttons. The remote microphone can be conveniently attached to a doctor's jacket, for example, allowing for hands-free operation. To ensure accurate association of the audio files with relevant information, users can manually enter patient names and room details. Alternatively, the system supports automatic association by leveraging RFID-equipped wristbands and nearby room tags that indicate the room number. During the initial setup process, configuration through the smart hub provides the necessary additional information for efficient audio file management. Once the audio files are recorded and stored in the local storage, they can be easily transferred to a server or cloud storage for further processing. Leveraging the power of artificial intelligence (AI) technology, the system employs automated transcription algorithms to convert the spoken content into a readable transcript. This AI-powered transcription process significantly enhances efficiency and accuracy, eliminating the need for manual transcriptions. By utilizing a cloud-based infrastructure, the transcription can be performed remotely, granting convenient access to the transcribed transcripts from any authorized device with internet connectivity. This allows healthcare professionals to conveniently review and access the transcriptions, promoting efficient communication and documentation within the healthcare environment.

In another non-traditional embodiment of a lighting system that extends its capabilities beyond illumination, advanced fire detection sensors can be incorporated into device mounting tracks. These sensors, with the help of AI algorithms, machine learning, and advanced data analysis techniques, continuously monitor for signs of fire not only in homes or buildings but also in outdoor environments such as open fields, parks, or streets. By leveraging intelligent technologies, the system can detect potential fire hazards more accurately, analyze complex data patterns, and promptly alert the designated owners when a potential fire is detected. The owners can confirm the situation and take appropriate action, such as calling 911 or approving, via an app for example, the smart network to alert the fire department command center. Upon receiving approval, the smart network grants temporary limited access to devices within the network to the firefighters and their command center. Firefighters can log into the smart network via an app or a desktop program to interact with specific features. For example, they can control smart speakers to communicate with trapped individuals or listen for distress signals, such as a barking dog. They can also access temperature readings from sensors inside the house or building to assess the situation, view camera feeds to determine the extent of the fire spread, and utilize keyless entry systems to gain entry into the premises when necessary. By promptly accessing these features, the command center can quickly determine the location and severity of the fire, as well as identify any potential hazards or obstacles that may impact their rescue efforts. In some embodiments, a 3D panoramic view of the interior of the house or building may be available, allowing for a more comprehensive understanding of the layout and potential escape routes. This information can help the command center plan a response accordingly, which can be relayed to the firefighters while they are en route to the fire site. The plan may include determining the most suitable entry point to use, deciding on the equipment to deploy, or even requesting assistance from neighboring firefighter departments if additional resources are required. By leveraging the capabilities of the smart network system, firefighters can have access to real-time data and insights that aid in their firefighting efforts, leading to more effective and efficient responses to emergency situations. The integration of advanced fire detection, real-time communication, and access to key systems enhances the overall safety and rescue operations within the smart network system.

In another non-traditional embodiment of a lighting system that extends its capabilities beyond illumination, a smart network with various components such as cameras, smart speakers, and other devices installed in the device mounting track can support law enforcement in critical situations like hostage scenarios or when an armed individual poses a threat to others. Given the recent rise in crime and mass shootings, these measures aim to enhance security and safety measures. For instance, in the case of a school shooting, law enforcement and authorized authorities may be granted access to live camera feeds inside the school, enabling them to gather real-time information, assess the situation, and make informed decisions to ensure the safety of all individuals involved. Additionally, providing law enforcement with access to smart speaker functions enables them to establish two-way communication with individuals inside the building or specific rooms when a direct phone line is not available. The smart speakers can serve as a valuable communication tool, allowing law enforcement to assess the situation, gather information, and provide instructions or assistance as needed. Furthermore, the use of keyless entry can be employed to override the locking or unlocking of individual doors, offering law enforcement greater control and flexibility in their response efforts. This feature allows them to quickly access necessary areas or secure specific sections of the building, aiding in their tactical approach and minimizing potential risks. By integrating live camera feeds, smart speakers for communication, and keyless entry capabilities, these measures aim to enhance law enforcement's ability to respond effectively, minimize harm, and resolve the situation in the safest possible manner. Additionally, relevant access can also be granted to members of a command center, where a team can view multiple cameras inside the building using one large or multiple screens, access smart speakers in multiple rooms, and utilize the 3D panorama view of inside the building. This access allows the command center team to have a better comprehensive overview of the situation, even before law enforcement arrives at the scene. They can also use law enforcement location (for example based on their smart phone or other smart devices attached to their uniform) to strategize the most effective way for law enforcement to enter the premises. By having access to these advanced technologies, the command center team can better coordinate their efforts, provide guidance and support to law enforcement, and take the necessary actions to protect lives and ensure the security of the affected premises. In some embodiments, the smart network can employ AI algorithms, machine learning, and advanced data analysis techniques to detect individuals carrying weapons, further enhancing the capabilities of the command center team. By utilizing these advanced techniques, the smart network can analyze camera feeds and other sensor data to identify individuals carrying weapons and provide real-time alerts to the command center such as a picture of the person carrying the weapon, their location within the building, the specific room they are in, and even the type of weapon being used. This information can be cross-referenced with law enforcement records databases to further enhance its accuracy and relevance. By providing the command center team with this real-time information, they can have a more comprehensive understanding of the situation at hand. This allows them to make informed decisions and take appropriate actions, such as dispatching and guiding law enforcement directly to the location of the threat within the building. This targeted approach saves valuable time and resources, as opposed to conducting a room-to-room sweep.

FIG. 6 illustrates embodiments demonstrating how a smart network system can establish interconnections with other smart network systems, expanding its capabilities beyond illumination and creating a seamless integration of different environments and applications. This embodiment showcases the versatility and scalability of the smart network, allowing it to extend its reach and functionality to various subsystems and devices. For example, the smart network can support the installation of multiple smart hubs, where one acts as a master smart hub. The master smart hub plays a central role in establishing a hierarchical and modular interconnection of small networks, each with its own smart hub. This modular approach enhances the organization and management of the interconnected networks, enabling efficient coordination and control. The hierarchical method discussed in this embodiment not only enables the modular interconnection of small networks but also complements and enhances the capabilities of mesh networking within the larger smart network system. While the hierarchical structure focuses on the organization and control of interconnected networks, appropriate networking configurations and integration mechanisms can be implemented to facilitate mesh networking between devices belonging to different small networks. This provides flexibility and fosters collaboration even when devices are part of separate small networks within the larger smart network system. In addition to supporting interconnections between small networks, the smart network system can establish connections with external devices. For example, it can enable a connection between a remote computer and a streetlight, facilitating remote monitoring and control of the streetlight's operation and settings. This remote access enhances the efficiency of managing street lighting by allowing real-time adjustments based on specific needs or conditions. Furthermore, the smart network system can extend its connectivity to nearby smart network systems such as vehicles or drones, creating a cohesive ecosystem where mobile devices can interact with the network. This integration opens up possibilities for enhanced transportation management, efficient traffic control, and collaborative applications like real-time data sharing for navigation or vehicle-to-infrastructure communication. By establishing interconnections with other smart network systems, the smart network system demonstrates its ability to seamlessly integrate diverse environments and applications. This integration leads to improved efficiency, enhanced control, and collaborative functionalities, ultimately creating a smarter and more connected ecosystem.

In another embodiment depicted in FIG. 6, a smart streetlight network can interconnect with another smart streetlight network, enabling synchronized lighting control and efficient energy management across a larger area. This interconnected setup enhances the overall performance and functionality of the lighting system. By interconnecting streetlight networks, they can collectively share and analyze data, providing valuable insights for optimizing lighting operations. The shared data can help identify areas requiring lighting adjustments, monitor energy consumption patterns, and detect maintenance requirements. This data-driven approach allows for proactive management of the streetlight network, resulting in improved energy efficiency and cost savings. Moreover, interconnected streetlights can serve as a medium for propagating messages and enabling centralized monitoring and control. Administrators can remotely access and manage the interconnected networks, adjusting lighting settings, schedules, and brightness levels as needed. This centralized control not only streamlines management processes but also ensures consistent and coordinated lighting across the interconnected networks. The collaborative and interconnected approach depicted in FIG. 6 results in a more intelligent lighting infrastructure, enhancing visibility, safety, and energy savings for the community as a whole. By leveraging the power of interconnectivity, the smart streetlight network becomes a unified system capable of delivering optimized lighting solutions and effective energy management across a larger area.

In another embodiment depicted in FIG. 6, the smart streetlight network can establish interconnections with the smart network in nearby vehicles, expanding the capabilities and functionality of both systems and allowing for the exchange of information such as speed and intended direction. This data exchange enables the smart streetlight network to gather real-time traffic information and predict potential traffic jams or congestion in advance. By analyzing the speed and direction of multiple vehicles, the streetlight network can dynamically adjust its lighting patterns and intensity to optimize traffic flow. Furthermore, the streetlight network can share this information with vehicles, providing real-time recommendations and alternative routes to drivers to help them avoid congested areas and reduce travel time. This collaborative approach between vehicles and streetlights enhances overall traffic management, improves the efficiency of the transportation system, and provides a smoother driving experience for commuters.

Figure 4D:
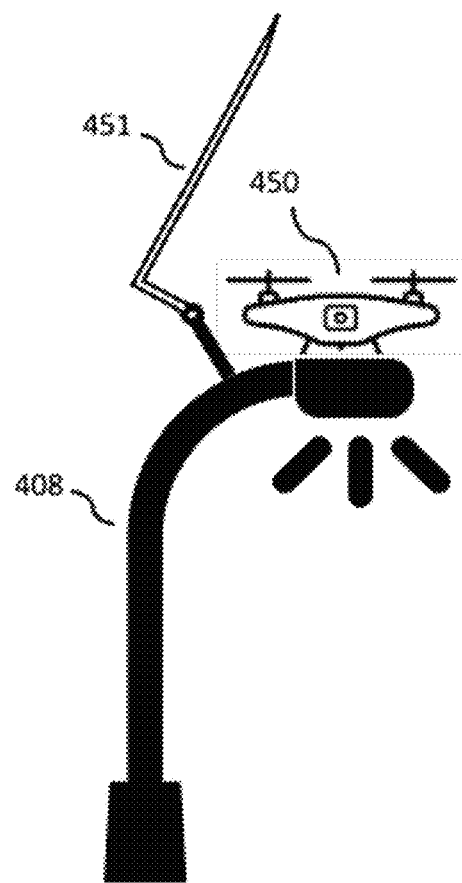
FIG. 4D illustrates an LED based smart street or parking lot light with landing pads for drones, according to some embodiments.
Figure 4E:
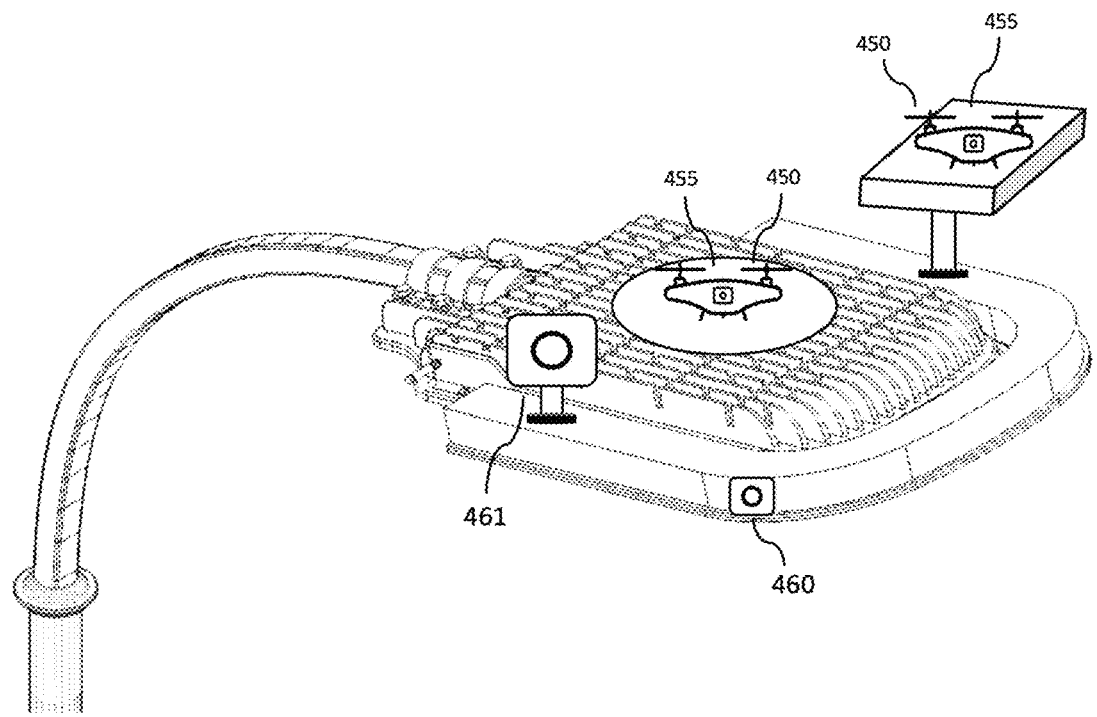
FIG. 4E illustrates an LED based smart street or parking lot light with multiple device mounting tracks and landing pads for drones, according to some embodiments.
Figure 5:
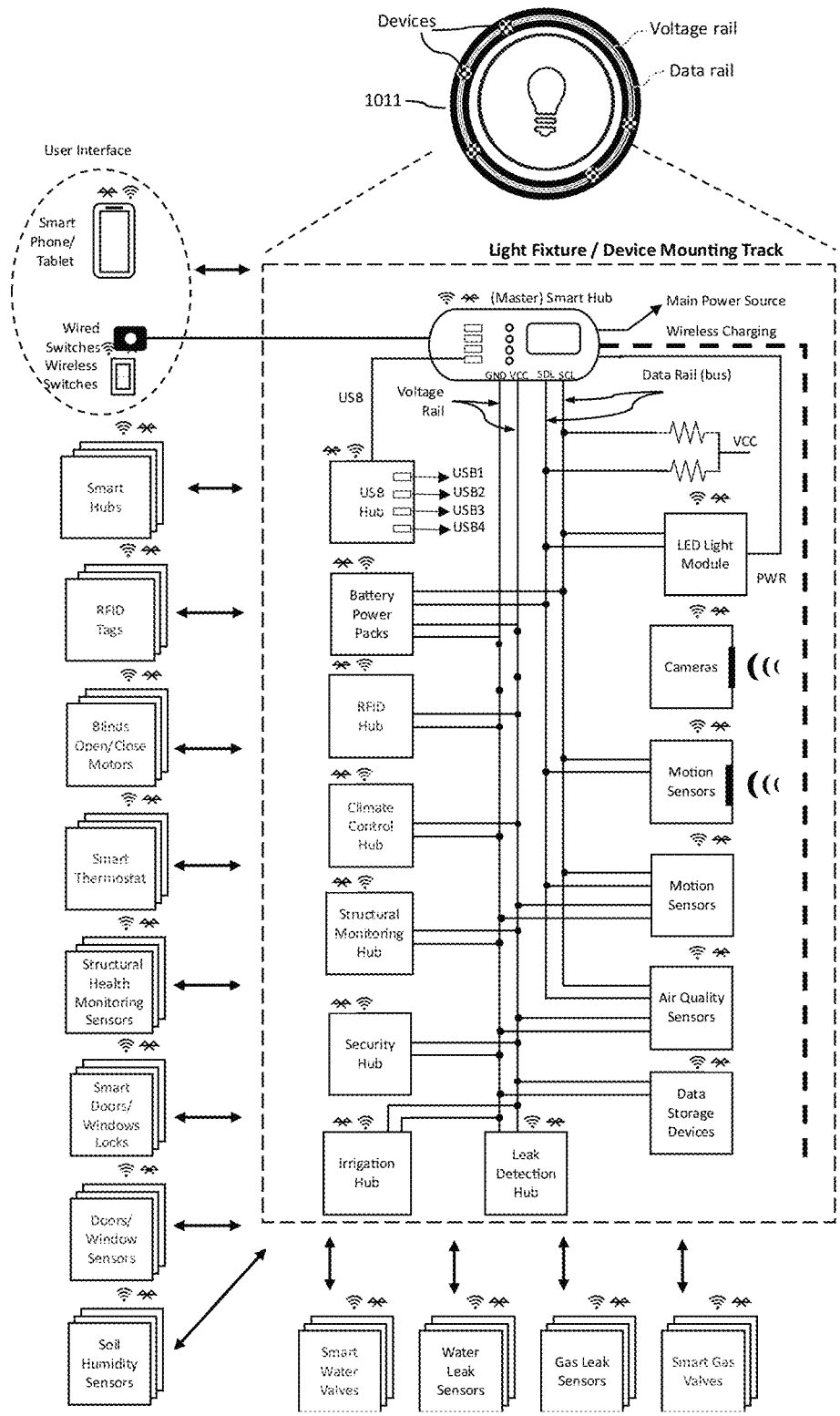

In an embodiment illustrated in FIG. 4D-4E, the top of smart streetlights or lights mounted on buildings or attached to structures can serve as multi-functional platforms that provide various services, including acting as drone landing pads and standby storage areas. The design of these smart lights incorporates features such as one or more landing pads (450) equipped with wireless charging capabilities, allowing drones to land and charge their batteries without the need for physical connections. The smart lights also feature One or more motorized covers (451) that can open and close automatically, be remotely operated on command, or be commanded by a drone using geolocation, enabling quick and convenient deployment of drones from the smart light fixture. Furthermore, the smart lights can be equipped with an optional delivery chute (456) that can be integrated internally within the light pole, externally attached to it, or attached to a nearby wall or structure as illustrated in FIG. 6. This versatile functionality offers multiple delivery methods, including a gravity feed mechanism, elevator systems, and vacuum tube systems. These options ensure efficient and flexible transportation of goods from the top of the light fixture to a lower level accessible to an average height person without the drone coming in close contact with individuals. The delivery chute features multiple compartments (458), each equipped with a locked door that can be opened only once to retrieve the package when in a public setting or with a password or key when in a private setting. A mechanism is employed to accurately select the appropriate compartment for each item needing to be delivered, ensuring organized and efficient delivery of goods. The gravity feed mechanism allows items to descend without motorized assistance, relying on gravity to guide the packages down to the designated compartment. The elevator systems provide controlled vertical transportation, ensuring smooth and secure delivery of goods between different levels. The vacuum tube systems utilize air pressure differentials to propel items through a tube, offering a fast and efficient means of delivery. Moreover, when not in use, the bottom of the chute can be raised away, optimizing space utilization in narrow and crowded sidewalks or other areas where the light fixture is installed. This feature ensures that the area remains accessible and unobstructed when the delivery chute is not actively used. By expanding the functionality of smart lights to include drone landing and delivery capabilities, the integration of these features offers enhanced efficiency, convenience, and versatility in various applications, such as delivery, surveillance, emergency response, and more.

In another embodiment depicted in FIG. 6, the smart streetlight network can establish interconnections with nearby drones, expanding the capabilities and functionality of both systems. In FIG. 4D-4E, the drone (455) may be equipped with one or more device mounting tracks, facilitating the installation of smart devices, including cameras, smart speakers, sensors, data storage devices, wireless communication equipment, and wired/wireless charging capabilities to perform a wide range of functions, gather data, and operate efficiently during its missions. Additionally, the drone can establish wireless connections with nearby smart networks of lighting, allowing seamless integration and remote accessibility of all its devices. This integration enables centralized control, monitoring, and management of the drone's operations, enhancing efficiency, coordination, and ease of use. The drone can also connect to a central server or a cloud-computing system, enabling data exchange, real-time updates, and access to computational resources for advanced data analysis and decision-making algorithms.

In another non-traditional use of a lighting system that extends its capabilities beyond illumination, a lighting system can employ cameras and other sensors installed in its device mounting track to detect fires, particularly in remote grassy and wooded areas where the chances of someone seeing and reporting a fire are low. By employing AI algorithms, machine learning, and advanced data analysis techniques, multiple cameras and sensors can be strategically installed to maximize coverage in different directions as illustrated in FIG. 4E. These advanced technologies can continuously analyze the captured video feed in real-time, searching for visual patterns and characteristics associated with fires, such as flames, smoke, or rapid changes in temperature. Once a fire is detected, an immediate alert is generated and transmitted to the relevant authorities, such as the closest fire department or emergency services. This enables them to respond swiftly and take necessary actions to prevent the fire from spreading and causing further damage. In certain embodiments, additional measures can be implemented to enhance the response to fire incidents. For instance, one or more drones can be deployed from nearby platforms. These drones can provide live footage to authorities, allowing them to assess the situation and plan an effective response. The drones can also be equipped with firefighting capabilities, enabling them to release a fire extinguishing agent from above, swiftly and effectively extinguishing the fire before it gets out of control. This innovative approach using drones integrated into the lighting system can significantly contribute to the early detection and suppression of fires in grassy or wooded areas, minimizing the risk of widespread damage and ensuring the safety of affected areas.

Figure 7:
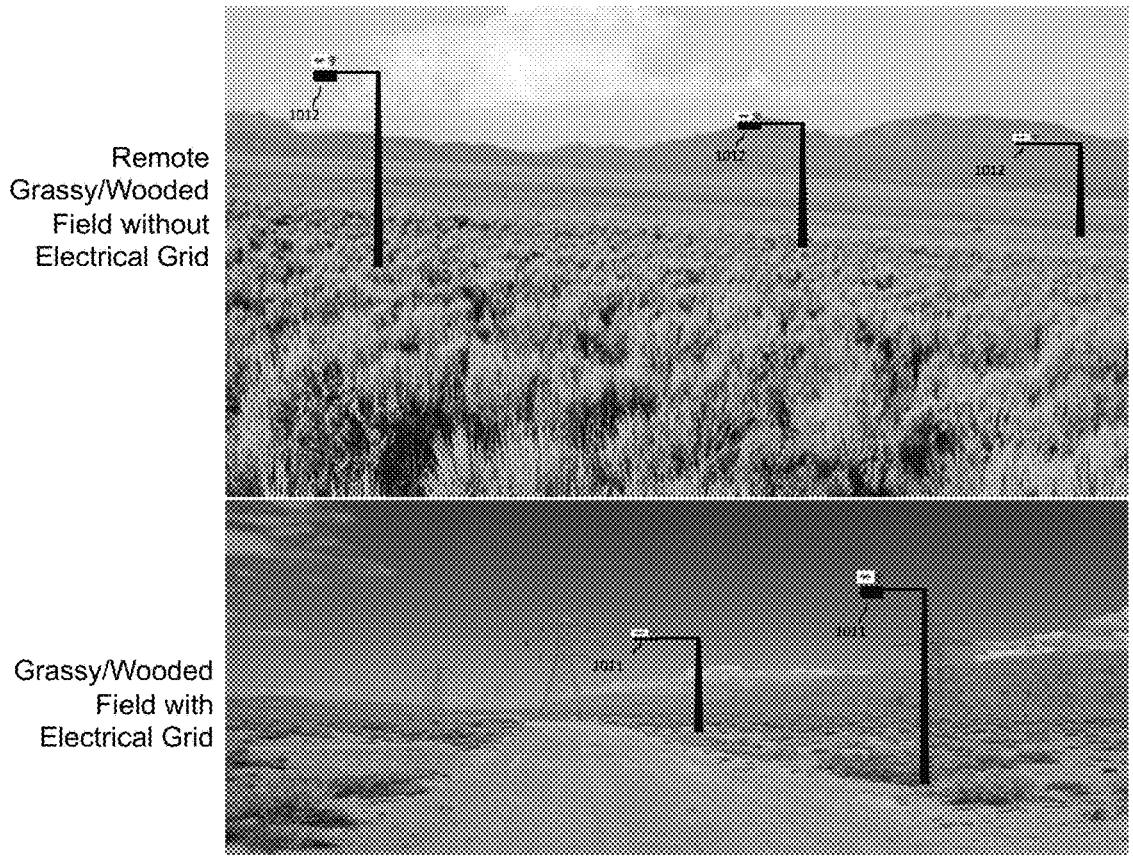
FIG. 7 illustrates a network of smart lighting systems, according to some embodiments.

Furthermore, the lighting system can be installed not only alongside roads or areas with access to an electrical grid (lighting system 1011) but also in remote locations (lighting system 1012), relying on renewable energy sources for self-sustainability and to power the lights and other integrated smart devices, as shown in FIG. 5-7. Incorporating renewable energy solutions such as solar panels or wind turbines enables the system to generate the necessary power to operate independently, even in areas without electrical grid connectivity. This ensures that the lighting system (1012) remains functional and capable of powering the integrated devices, such as cameras, sensors, and communication systems, even in the most remote locations. Additionally, the lighting system installation and spacing ensures a continuous line of communication between the smart lights and a central server or cloud computing infrastructure. These connections can be established using various methods, including satellite communication or connecting to remote servers and the cloud via one or more connection points such as satellite or cell towers. This network of lights creates a seamless and interconnected system that can transmit and receive data, enabling remote monitoring, control, and data collection. The self-sustained lighting system can play a crucial role in fire detection, particularly in remote areas prone to drying vegetation. The integrated sensors and AI algorithms can detect fires early on and alert the relevant authorities promptly, minimizing the risk of widespread damage. Furthermore, the lighting system can deploy drones, as mentioned previously, to suppress the fire quickly and effectively. Moreover, the self-sustained lighting system can be employed for environmental and weather data collection. The integrated sensors in the smart lights can gather valuable information such as air quality, temperature, and precipitation. This data can be transmitted to the central server, allowing authorities and researchers to monitor environmental conditions and gather insights for various purposes, including planning, climate studies, and resource management. Furthermore, the lighting system's integrated cameras, sensors, AI algorithms, machine learning, and advanced data analysis techniques can be utilized in wildlife monitoring and animal surveillance tasks. These technologies enable the system to differentiate between different species, count animals, and contribute to conservation efforts and ecological research. The integration of renewable energy sources, continuous communication, and a diverse range of functionalities in the lighting system enhances its capabilities in fire detection, environmental data collection, and wildlife monitoring, thereby supporting various applications and contributing to sustainable and intelligent infrastructure.

In a further embodiment of the current invention that enhances the application of systems beyond just illuminating, the integration of other systems with smart lighting systems allows for collaboration in performing a variety of useful smart functions and tasks. One such example is in the area of traffic monitoring. In the case of an accident, first responders may be granted access, via a computer or mobile device, to live video footage of the scene through cameras installed in nearby light fixtures device mounting tracks. However, if first responders are unable to obtain a clear view of the incident, a drone system can be deployed automatically or on demand to provide a close-up look and assist in determining an appropriate response. First responders have the capability to exercise complete control over the drone, including operating the devices onboard. They can have full control over the drone's flight movements, as well as access to control and manipulate the functions of the onboard devices, such as cameras with zoom capabilities and other relevant features. This level of control allows first responders to gather critical visual information and make informed decisions in real-time during emergency situations. In some scenarios, the responsibilities of flying the drone and monitoring the camera feed may be shared among multiple personnel. This collaborative approach allows for a coordinated effort in controlling and managing the drone, ensuring comprehensive coverage and maximizing the effectiveness of the captured data. Once the mission is complete, the drone can return to its designated landing and charging pad. This landing pad can be conveniently located on top of a smart streetlight, offering a secure and easily accessible location for the drone to safely land and initiate the recharging process. During this time, the captured data can be transferred from the drone to a central monitoring and command center. This central location serves as a hub for storing and analyzing the collected data, allowing authorities to review and extract valuable insights for further decision-making and response planning.

In another non-traditional use of a lighting system that extends its capabilities beyond illumination, the smart streetlight network not only provides illumination but also can serve as a powerful tool for security and crime fighting. In the event of a robbery or crime in progress, the network can leverage AI algorithms, machine learning, and advanced data analysis techniques to analyze video footage from cameras installed on device mounting tracks. By employing facial recognition algorithms, relevant pictures of the suspect(s) can be shared with other cameras, including those on the parking lot light device mounting track, to conduct a comprehensive lookout. Once identified, the suspect(s) can be tracked, whether they are on foot or in a getaway vehicle, utilizing private or public streetlight cameras. In cases where additional assistance is required, a drone can be deployed to aid in the tracking process. Real-time streaming video can be relayed to local authorities, providing them with vital information such as images of the individual, details about the getaway vehicle (including its colour, model, and license plate number), and other pertinent data. To further assist law enforcement, the drone may drop a GPS tagging device, which can transmit the precise location of the suspect(s)'s getaway vehicle to local authorities. This additional information allows for more efficient and effective response strategies, improving the chances of apprehending the suspects and resolving the situation promptly. By integrating advanced surveillance and tracking capabilities, the smart streetlight network contributes significantly to the overall security and crime prevention efforts in smart cities and communities.

In another non-traditional embodiment that extends its capabilities beyond illumination, a lighting system can integrate with an irrigation system to enhance plant monitoring and watering processes. By leveraging cameras installed in the device mounting track, along with other sensors and advanced AI algorithms, the smart network can effectively monitor the condition of grass, flowers, and other plants, assessing their watering needs. The integrated system utilizes cameras and flex sensors to capture visual data of the vegetation, including colour and profile (such as leaning or erect position). Additional sensors may measure moisture levels in the soil and other relevant environmental factors. These inputs are then processed by advanced AI algorithms, which analyze the collected information to determine the hydration requirements of the plants. Based on the evaluation, the lighting system can communicate with the irrigation system to initiate watering when necessary. This intelligent coordination ensures efficient water usage and minimizes wastage by delivering targeted irrigation to specific areas or plants that require it the most. By extending the capabilities of the lighting system to include plant monitoring and irrigation integration, the smart network promotes sustainable and resource-conscious practices in maintaining green spaces and gardens. It optimizes water usage, supports healthy plant growth, and contributes to the overall environmental sustainability of smart cities and communities. This integration enables efficient plant care and conserves water resources, aligning with sustainable practices and enhancing the overall beauty and health of urban green areas.

Figure 3M:
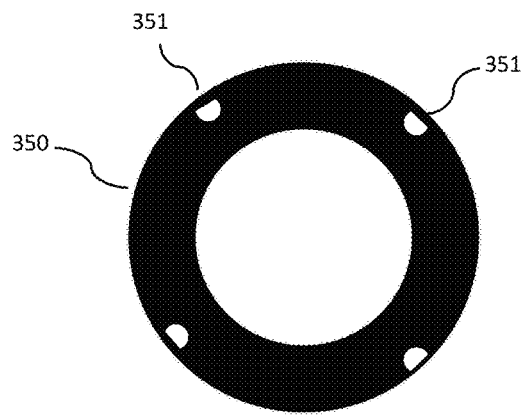
FIG. 3M illustrate a fire extinguisher canister with 4 dispensing nozzles, according to some embodiments.
Figure 3N:
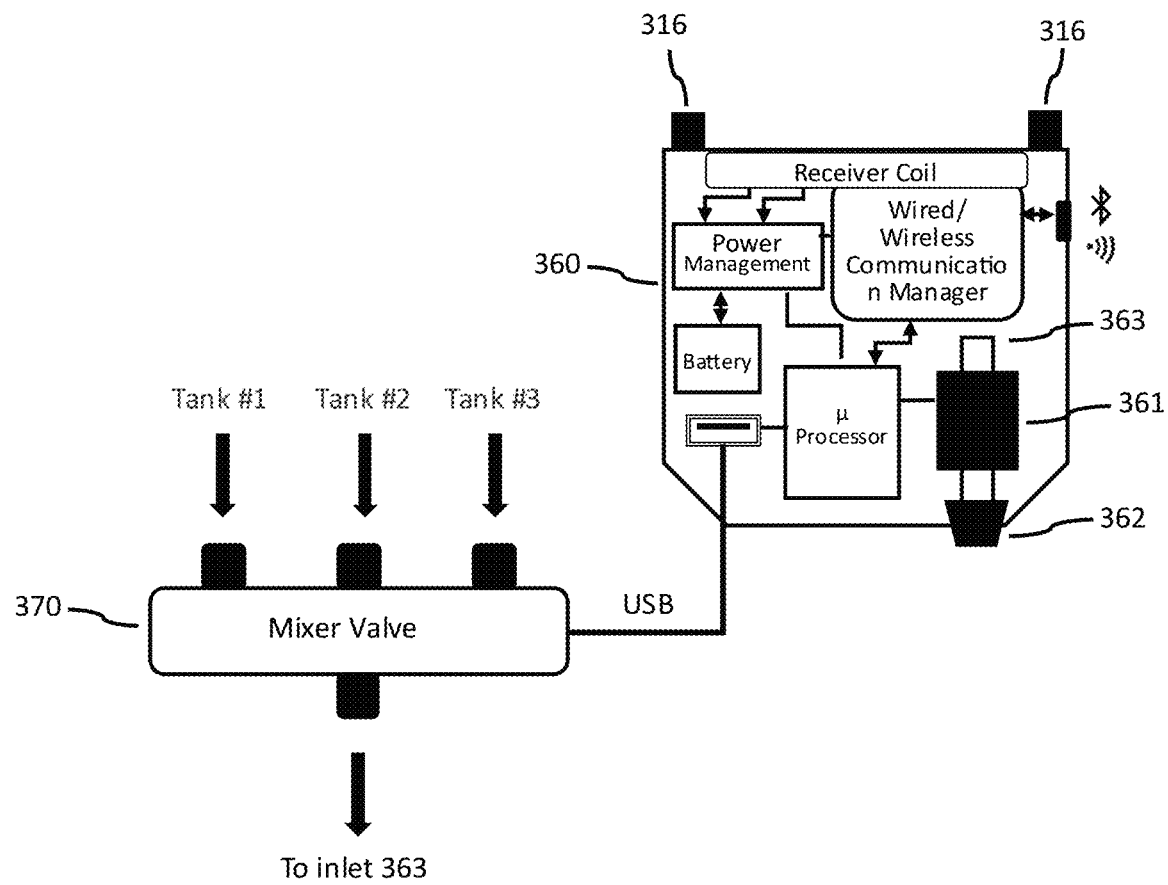
FIG. 3N illustrate an air freshener dispenser valve and a mixer valve, according to some embodiments.

The present invention encompasses the integration of devices with mechanical moving components into the device mounting track, enabling their incorporation into smart homes, smart buildings, or smart cities while maintaining a clean and uncluttered appearance and a streamlined design. One notable example of such a device is a fire extinguisher canister, which significantly enhances the safety of residents when installed in a home. In FIG. 3M, the embodiment illustrates a fire extinguisher canister (350) that can be easily installed in the device mounting track. This canister is equipped with one or more sprinkler heads (351) and is designed to automatically release an extinguishing agent in the event of a fire. One of its primary purposes is to create a safe evacuation pathway to the exterior of a home, building, or structure when multiple device mounting tracks/ canisters are installed along that path, ensuring the safety of the occupants. The fire extinguisher features a compact design that can take the shape of a donut or partial donut, depending on the specific embodiment. This compact form allows for efficient use of space and seamless integration into the device mounting track, contributing to the overall aesthetic and uncluttered appearance of the environment. Moreover, the use of canister in the shape of a partial donut, leaves room for the installation of other compatible devices in the device mounting track, offering additional functionality and versatility to the system. In an alternative embodiment depicted in FIG. 3N, a fire extinguisher delivery system (360) may be installed in the device mounting track, while the canister or tank is positioned externally to the track. In one embodiment, a direct connection can be established between the tank and the delivery head inlet (363), allowing for efficient fire suppression when required. In an alternative embodiment, an optional mixer (370) with one or more inlet ports can be utilized to connect one or more tanks to the delivery system, expanding the fire suppression capabilities. The delivery system (360) controls the mixer using the USB protocol, providing convenient and effective control over the fire extinguisher system. The integration of the fire extinguisher into the device mounting track enhances the overall safety and functionality of the space, making it an integral part of a smart and secure environment. It ensures effective fire suppression when needed, providing occupants with a reliable and accessible means of escape. This integration not only enhances safety but also maintains the aesthetic appeal of the surroundings, showcasing the seamless integration of devices with mechanical moving components into the device mounting track.

Another example of a device with mechanical moving components that can be integrated into the device mounting track is an air freshener. The air freshener system can be designed in various configurations. In the illustrated embodiment of FIG. 3N, the air freshener delivery system (360) includes an inlet (363) that can be attached directly to an air freshener supply tank or connected to an optional selector/mixer valve (370) that is linked to one or more tanks. The delivery system (360) controls the selector/mixer valve (370) using the USB protocol, and the valve controls the flow of fragrances from the tanks. The delivery system also consists of a dispensing valve (361) and an adjustable nozzle (362) for controlling the spray angle and direction. The delivery system is powered wirelessly to dispense metered fragrances on a timed basis or on demand. Users can conveniently adjust the spray angle and direction through a smart device or handheld control, offering convenient control options. Additionally, the air freshener system incorporates a supply level monitoring feature. It provides real-time status updates on the supply level, indicating the filled percentage or alerting users when the supply is empty. By integrating the air freshener system into the device mounting track, it becomes part of the interconnected network of devices and can be coordinated with other smart systems in the environment. For example, it can be synchronized with the HVAC system or occupancy sensors to dispense fragrances when certain conditions are met, such as when a room is occupied or when specific scents are desired to enhance the ambiance. In another embodiment, the air freshener supply can be stored in one or more remote tanks located outside the device mounting track. This arrangement allows for a larger capacity and reduces the frequency of refills. Users can control and customize the operation of the air freshener system through a smart device or handheld control. They can adjust the timing and frequency of fragrance dispensing, as well as select specific scents or fragrance combinations using an optional selector/mixer (370) that can be powered via USB. This level of control and personalization enhances the overall user experience and allows individuals to create a pleasant and refreshing environment according to their preferences.

In another embodiment of the present invention that expands the applications of smart light systems beyond illumination, the device mounting track can incorporate a projector. This projector may be designed to be retractable when not in use, ensuring a clean and uncluttered appearance. The projector enables the projection of various content, such as movies, art displays, department store sale and catching phrases, company logos, or mission statements, onto walls or floors. This feature adds a dynamic and visually captivating element to the environment, allowing for creative expression and effective branding. Additionally, the projector integrated into the smart light device mounting track can project interactive games onto walls or floors. Users can interact with these games using individual body gestures or location-based input from wearable e devices, providing a unique and immersive gaming experience. By leveraging body movements or device input, users can actively engage with the projected content, fostering entertainment and interactivity in public spaces. With the inclusion of a retractable projector in the smart light device mounting track, the invention enhances the versatility and functionality of smart light systems. It offers opportunities for entertainment, artistic expression, and effective communication of branding or messages. This innovative feature enriches the overall ambiance of public spaces, promoting engagement, creativity, and enjoyment among individuals and communities.

Figure 8:
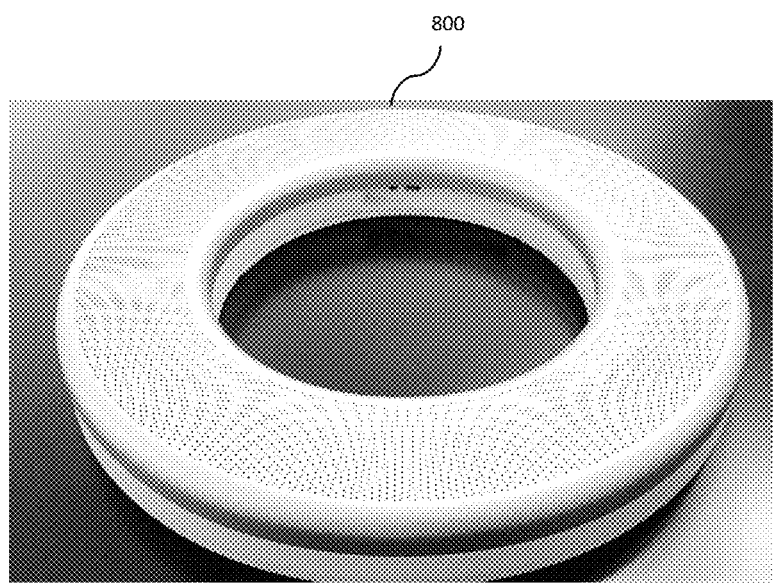
FIG. 8 illustrates a smart speaker for use in device mounting track, according to some embodiments.

FIG. 8 illustrates a smart speaker specifically designed for seamless integration into a device mounting track, showcasing various embodiments of the invention. The smart speaker (800) offers an elegant and space-saving solution for audio playback and voice control functionality within the device mounting track. It features a compact design that can take the shape of a donut or partial donut, depending on the specific embodiment. The smart speaker (800) is designed to interact with a smart hub, enabling users to orchestrate their smart ecosystem not only within their homes but also beyond. By connecting to a smart hub, the smart speaker (800) becomes a central control point, allowing users to effortlessly manage and control their interconnected devices, services, and applications. Within the home environment, users can use the smart speaker (800) to control and adjust various smart devices, such as lighting systems, thermostats, security cameras, and more. They can issue voice commands to activate specific scenes or routines, creating personalized and automated settings for different scenarios. Moreover, the integration of the smart speaker with the smart hub expands its functionality beyond the confines of a single home. In commercial spaces, such as offices, retail stores, or hospitality venues, the smart speaker can facilitate seamless control over various systems. It can provide audio announcements, background music, or voice-controlled services to enhance customer experiences. In public venues, the smart speaker can deliver important announcements, offer interactive information services, or provide audio guidance for visitors. By allowing users to orchestrate their smart ecosystem in homes and beyond, the smart speaker and smart hub combination offer convenience, efficiency, and enhanced user experiences. The integration of voice control, automation, and centralized management provides users with a powerful tool to create a connected and intelligent environment tailored to their needs and preferences.

In certain embodiments, as depicted in FIG. 5-6, the smart network includes redundancy measures for some of the plurality of smart devices, ensuring uninterrupted functionality and operation of the system. Redundancy is achieved by including duplicate or backup devices that can seamlessly take over the tasks and responsibilities of a failed device. The device mounting track system facilitates the easy addition of redundant devices, allowing for quick and hassle-free installation. By simply inserting the redundant device into the device mounting track, it becomes integrated into the system, ready to assume its role in case of device failure. This user-friendly feature simplifies the process of incorporating redundant devices, ensuring system reliability and minimizing any downtime caused by device failures.

What is claimed:

1. A smart light fixture, comprising:
   one or more light sources;
   one or more device mounting track systems each including a coupling mechanism configured to removably couple with a plurality of devices, the one or more device mounting track systems including one or more voltage rails extending along the device mounting track system, the one or more voltage rails operable to deliver electrical power to the devices through conductive connections upon the devices being coupled with and thereby coming into contact with the one or more device mounting track systems;
   one or more smart hubs configured to be installed with the smart light fixture and coupled to the one or more device mounting track systems.

2. The smart light fixture of claim 1, wherein the coupling mechanism includes a magnet configured to accept at least one device of the plurality of devices coupled thereto.

3. The smart light fixture of claim 1, wherein the one or more device mounting track systems is positioned around or substantially around the circumference of the one or more light sources.

4. The smart light fixture of claim 1, comprising one or more wireless power transmitters operable to wirelessly deliver power to the devices, utilizing at least one of electromagnetic induction, resonant coupling, optical power delivery, and infrared power delivery.

5. The smart light fixture of claim 1, wherein the one or more device mounting track systems is configured with one or more physical data rail/bus systems to facilitate the interconnection of the plurality of devices with each other and with the smart hub using a communication bus standard for communicating with the plurality of devices.

6. The smart light fixture of claim 1, wherein the one or more smart hubs is configured to establish a localized smart network by interconnecting the one or more devices and enabling at least one of data storage, exchange and synchronization between the one or more devices.

7. The smart light fixture of claim 6, wherein localized smart network is configured to interconnect with at least one of external networks, systems, and platforms, including at least one of cloud platforms, home and building automation systems, city automation systems, vehicles, IoT platforms, enterprise networks, handheld devices, and computers, and other compatible systems.

8. The smart light fixture of claim 7, wherein the one or more device mounting track systems is configured to connect to handheld devices or computers, enabling setup, configuration, and management of the plurality of devices.

9. The smart light fixture of claim 1, further comprising redundant devices configured to be automatically placed in service upon failure of a like device.

10. The smart light fixture of claim 1, wherein the plurality of devices include at least one device that uses the one or more mounting tracks for mechanical mounting without electrification.

11. The smart light fixture of claim 1, further comprising:
    one or more device mounting track covers configured to fully or partially cover the plurality of devices.

12. The smart light fixture of claim 1, further comprising: one or more compartments, configured for arranging the plurality of devices within the compartments.

13. The smart light fixture of claim 1, further comprising:
    one or more drone landing pads and drone storage area including a drone charger electrically coupled to the one or more track systems.

14. The smart light fixture of claim 1, wherein one or more of the plurality of devices includes one or more delivery mechanisms configured to deliver at least one of powders, liquids, and gasses.

15. A smart light fixture, comprising:
    one or more device mounting track systems including a coupling mechanism configured to removably couple with one or more powered devices, the device mounting tracks being at least partially electrified via one or more voltage rails to provide power to each powered device upon the powered device contacting the device mounting track system;
    one or more smart hubs configured to be installed with the smart light fixture and coupled to the one or more device mounting track systems, at least one of the one or more smart hubs being a monitoring smart hub;
    wherein the one or more device mounting track systems is shaped to mount around the circumference of a light source.

16. The smart light fixture of claim 15, wherein the monitoring hub is a fire detection hub configured with algorithms to monitor for signs of fire and to control devices related to fire alerting and firefighting.

17. The smart light fixture of claim 15, wherein the monitoring hub is a security monitoring hub configured with algorithms to monitor for security threats and enhance security response.

18. The smart light fixture of claim 15, wherein the monitoring hub is a vegetation monitoring hub configured with algorithms to monitor vegetation health and growing conditions.

19. The smart light fixture of claim 15, wherein the monitoring hub is a structural health monitoring hub configured to monitor a condition of the structure the smart light fixture is positioned on or within.

20. The smart light fixture of claim 15, wherein the monitoring hub is an RFID monitoring hub configured with algorithms for monitoring RFID tags and for managing RFID tagged items.

* * * * *